United States Patent
Jiang et al.

(10) Patent No.: US 11,159,271 B2
(45) Date of Patent: *Oct. 26, 2021

(54) PROTOCOL LAYER PACKET CODING FOR TRANSMITTER/RECEIVER BUFFER OPTIMIZATION

(71) Applicant: QUALCOMM Incorporated, San Diego, CA (US)

(72) Inventors: Jing Jiang, San Diego, CA (US); Yu-Ting Yu, San Francisco, CA (US); Feilu Liu, San Diego, CA (US); Tingfang Ji, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/685,781

(22) Filed: Nov. 15, 2019

(65) Prior Publication Data
US 2020/0083982 A1    Mar. 12, 2020

Related U.S. Application Data

(63) Continuation of application No. 15/228,291, filed on Aug. 4, 2016, now Pat. No. 10,484,129.
(Continued)

(51) Int. Cl.
*H04L 1/00* (2006.01)
*H04L 1/18* (2006.01)
(Continued)

(52) U.S. Cl.
CPC .......... *H04L 1/0041* (2013.01); *H04L 1/0009* (2013.01); *H04L 1/0058* (2013.01);
(Continued)

(58) Field of Classification Search
None
See application file for complete search history.

(56) References Cited

U.S. PATENT DOCUMENTS 7,096,400 B2   8/2006   Lim et al.
7,131,049 B2   10/2006  Kim et al.
(Continued)

FOREIGN PATENT DOCUMENTS

CN    104753627 A    7/2015
CN    105247808 A    1/2016

OTHER PUBLICATIONS

International Search Report and Written Opinion—PCT/US2016/067522—ISA/EPO—dated Jun. 13, 2017.
(Continued)

*Primary Examiner* — Justin R Knapp
(74) *Attorney, Agent, or Firm* — Alan Gordon

(57) ABSTRACT

A method, an apparatus, and a processor-readable storage medium for wireless communication are provided. A transmitter transmits data packets to a receiver, encodes the data packets to generate parity packets, stores the parity packets in a retransmission buffer, receives information from the receiver indicating that a data packet was not correctly decoded, and transmits to the receiver the parity packets stored in the retransmission buffer for recovering the data packet not correctly decoded without retransmitting the data packet not correctly decoded. The transmitter may further retransmit to the receiver the parity packets. The transmitted data packets may be encoded at a medium access control (MAC) layer of the transmitter. The retransmission buffer may be located at a radio link control (RLC) layer or a packet data convergence protocol (PDCP) layer of the transmitter. A reordering buffer at the receiver may be located at the RLC layer or PDCP layer.

21 Claims, 17 Drawing Sheets

Related U.S. Application Data

(60) Provisional application No. 62/281,680, filed on Jan. 21, 2016.

(51) Int. Cl.
*H04W 72/04* (2009.01)
*H04W 88/06* (2009.01)

(52) U.S. Cl.
CPC .......... *H04L 1/1819* (2013.01); *H04L 1/1883* (2013.01); *H04W 72/042* (2013.01); *H04W 72/0413* (2013.01); *H04W 88/06* (2013.01)

(56) References Cited

U.S. PATENT DOCUMENTS

| | | | |
|---|---|---|---|
| 9,300,437 B2 | 3/2016 | Murakami | |
| 10,484,129 B2* | 11/2019 | Jiang | .................... H04L 1/0058 |
| 2002/0091976 A1 | 7/2002 | Lee et al. | |
| 2003/0072286 A1 | 4/2003 | Kim et al. | |
| 2008/0022190 A1 | 1/2008 | Ver Steeg | |
| 2013/0343273 A1 | 12/2013 | Barbieri et al. | |
| 2015/0023370 A1 | 1/2015 | Sammour et al. | |
| 2015/0381204 A1 | 12/2015 | Zhang et al. | |
| 2016/0036618 A1* | 2/2016 | Einhaus | .................. H04L 27/34 370/329 |
| 2017/0041100 A1 | 2/2017 | Xie et al. | |
| 2017/0085354 A1 | 3/2017 | Kudekar et al. | |
| 2017/0180083 A1 | 6/2017 | Murakami | |
| 2017/0214489 A1 | 7/2017 | Jiang et al. | |

OTHER PUBLICATIONS

LG Electronics: "Considerations on the Design of Transport Block Size Table," 3GPP TSG RAN WG1 #52bis; R1-081250, TB Size Signaling, Mar. 26, 2008, 12 pages, XP050109693.
Partial International Search Report—PCT/US2016/067522—ISA/EPO—dated Mar. 28, 2017.
Wu M., et al., "IPTV Multicast Over Wireless LAN using Merged Hybrid ARQ with Staggered Adaptive FEC," IEEE Transactions on Broadcasting, IEEE Service Center, Jul. 1, 2009, vol. 55 (2), XP011343482, 13 Pages.
3GPP: "3rd Generation Partnership Project; Technical Specification Group Radio Access Network", 3GPP TS 38.214, Dec. 15, 2015.

* cited by examiner

PROTOCOL LAYER PACKET CODING FOR TRANSMITTER/RECEIVER BUFFER OPTIMIZATION

CROSS-REFERENCE TO RELATED APPLICATIONS

This application is a continuation application of U.S. Non-Provisional application Ser. No. 15/228,291, entitled "PROTOCOL LAYER PACKET CODING FOR TRANSMITTER/RECEIVER BUFFER OPTIMIZATION" filed on Aug. 4, 2016, which claims priority to and the benefit of U.S. Provisional Application Ser. No. 62/281,680, entitled "PROTOCOL LAYER PACKET CODING FOR TRANSMITTER/RECEIVER BUFFER OPTIMIZATION" filed on Jan. 21, 2016, the entire contents of which are incorporated herein by reference.

BACKGROUND

Field

The present disclosure relates generally to communication systems, and more particularly, to retransmitting data packets from a transmitting device to a receiving device in a wireless communication system.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. Examples of telecommunication standard include Long Term Evolution (LTE) and LTE-Advanced (LTE-A), which include a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. However, as the demand for mobile broadband access continues to increase, there exists a need for further improvements in multiple access technologies technology. Preferably, these improvements should be applicable to existing and developing multi-access technologies and the telecommunication standards that employ such technologies.

SUMMARY

Embodiments disclosed herein provide systems, methods and apparatus for retransmitting data packets from a transmitting device to a receiving device in a wireless communication system.

In an aspect of the disclosure, a method of wireless communication at a transmitting device includes transmitting, to a receiving device, a plurality of data packets, encoding the plurality of transmitted data packets to generate one or more parity packets, storing the one or more parity packets in a retransmission buffer, receiving, from the receiving device, information indicating that one or more transmitted data packets was not correctly decoded and/or a number of the one or more transmitted data packets that was not correctly decoded, and transmitting, to the receiving device, the one or more parity packets stored in the retransmission buffer for recovering the one or more transmitted data packets not correctly decoded without retransmitting the one or more transmitted data packets not correctly decoded. The method may further include retransmitting, to the receiving device, the one or more parity packets for recovering the one or more transmitted data packets not correctly decoded.

According to certain aspects of the disclosure, the plurality of data packets transmitted to the receiving device does not include the one or more parity packets. The plurality of transmitted data packets are encoded at a medium access control (MAC) layer or a radio link control (RLC) layer of the transmitting device. The retransmission buffer is located at a medium access control (MAC) layer of the transmitting device. The encoding is performed across multiple links at a packet data convergence protocol (PDCP) layer. Each of the plurality of data packets have a unified code block size for different modulation and coding schemes. The plurality of transmitted data packets are encoded according to a coding scheme that is configured based on a radio resource control (RRC) message. The one or more parity packets are stored in the retransmission buffer based on a status timer duration and a generation size, and wherein the status timer duration and the generation size are configured based on a radio resource control (RRC) message. The one or more parity packets are transmitted based on a parity timer duration that is configured based on a radio resource control (RRC) message.

In another aspect of the disclosure, a transmitting device configured to communicate in a wireless network includes a transceiver, a retransmission buffer, and a processing circuit coupled to the retransmission buffer and the transceiver. The processing circuit is configured to transmit, to a receiving device, a plurality of data packets, encode the plurality of transmitted data packets to generate one or more parity packets, store the one or more parity packets in the retransmission buffer, receive, from the receiving device, information indicating that one or more transmitted data packets was not correctly decoded and/or a number of the one or more transmitted data packets that was not correctly decoded, and transmit, to the receiving device, the one or more parity packets stored in the retransmission buffer for recovering the one or more transmitted data packets not correctly decoded without retransmitting the one or more transmitted data packets not correctly decoded. The processing circuit is further configured to retransmit, to the receiving device, the one or more parity packets for recovering the one or more transmitted data packets not correctly decoded.

In a further aspect of the disclosure, a transmitting device configured to communicate in a wireless network includes means for transmitting, to a receiving device, a plurality of data packets, means for encoding the plurality of transmitted data packets to generate one or more parity packets, means for storing the one or more parity packets in a retransmission buffer, means for receiving, from the receiving device, information indicating that one or more transmitted data packets was not correctly decoded and/or a number of the one or more transmitted data packets that was not correctly decoded, and means for transmitting, to the receiving device, the one or more parity packets stored in the retransmission buffer for recovering the one or more transmitted data packets not correctly decoded without retransmitting the one or more transmitted data packets not correctly decoded. The transmitting device may further include means for retransmitting, to the receiving device, the one or more parity packets for recovering the one or more transmitted data packets not correctly decoded.

In another aspect of the disclosure, a processor-readable storage medium having one or more instructions which, when executed by at least one processing circuit, cause the at least one processing circuit to transmit, to a receiving device, a plurality of data packets, encode the plurality of transmitted data packets to generate one or more parity packets, store the one or more parity packets in the retransmission buffer, receive, from the receiving device, information indicating that one or more transmitted data packets was not correctly decoded and/or a number of the one or more transmitted data packets that was not correctly decoded, and transmit, to the receiving device, the one or more parity packets stored in the retransmission buffer for recovering the one or more transmitted data packets not correctly decoded without retransmitting the one or more transmitted data packets not correctly decoded. The one or more instructions may further cause the at least one processing circuit to retransmit, to the receiving device, the one or more parity packets for recovering the one or more transmitted data packets not correctly decoded.

In an aspect of the disclosure, a method of wireless communication at a receiving device, includes receiving, from a transmitting device, a plurality of data packets, detecting that one or more data packets of the plurality of data packets was not correctly decoded, transmitting, to the transmitting device, information indicating that the one or more data packets was not correctly decoded and/or a number of the one or more data packets that was not correctly decoded, receiving, from the transmitting device, one or more parity packets for recovering the one or more data packets not correctly decoded, and decoding the one or more parity packets and recovering the one or more data packets not correctly decoded based on the decoded one or more parity packets without receiving a retransmission of the of the one or more data packets not correctly decoded. The method may further include receiving, from the transmitting device, a retransmission of the one or more parity packets, wherein recovery of the one or more data packets is further based on the received retransmission of the one or more parity packets. The method may also include reordering the plurality of data packets based on the recovered one or more data packets, the reordering including waiting for the retransmission of the one or more parity packets to recover the one or more data packets not correctly decoded prior to reordering the plurality of data packets, and sending the reordered plurality of data packets to a higher layer.

According to certain aspects of the disclosure, the plurality of data packets received from the transmitting device does not include the one or more parity packets. The reordering is performed at a medium access control (MAC) layer, a radio link control (RLC) layer, or a packet data convergence protocol (PDCP) layer of the receiving device. The one or more parity packets are decoded at a medium access control (MAC) layer of the receiving device. The decoding is performed across multiple links at a packet data convergence (PDCP) layer. Each of the plurality of data packets have a unified code block size for different modulation and coding schemes. The one or more parity packets are decoded according to a coding scheme that is configured based on a radio resource control (RRC) message. The one or more parity packets are received based on a parity timer duration that is configured based on a radio resource control (RRC) message.

In another aspect of the disclosure, a receiving device configured to communicate in a wireless network includes a transceiver, and a processing circuit coupled to the transceiver. The processing circuit is configured to receive, from a transmitting device, a plurality of data packets, detect that one or more data packets of the plurality of data packets was not correctly decoded, transmit, to the transmitting device, information indicating that the one or more data packets was not correctly decoded and/or a number of the one or more data packets that was not correctly decoded, receive, from the transmitting device, one or more parity packets for recovering the one or more data packets not correctly decoded, and decode the one or more parity packets and recover the one or more data packets based on the decoded one or more parity packets without receiving a retransmission of the one or more data packets not correctly decoded. The processing circuit is further configured to receive, from the transmitting device, a retransmission of the one or more parity packets, wherein recovery of the one or more data packets is further based on the received retransmission of the one or more parity packets. The processing circuit is further configured to reorder the plurality of data packets based on the recovered one or more data packets, the reordering including waiting for the retransmission of the one or more parity packets to recover the one or more data packets not correctly decoded prior to reordering the plurality of data packets, and send the reordered plurality of data packets to a higher layer.

In a further aspect of the disclosure, a receiving device configured to communicate in a wireless network includes means for receiving, from a transmitting device, a plurality of data packets, means for detecting that one or more data packets of the plurality of data packets was not correctly decoded, means for transmitting, to the transmitting device, information indicating that the one or more data packets was not correctly decoded and/or a number of the one or more data packets that was not correctly decoded, means for receiving, from the transmitting device, one or more parity packets for recovering the one or more data packets not correctly decoded, and means for decoding the one or more parity packets and recovering the one or more data packets not correctly decoded based on the decoded one or more parity packets without receiving a retransmission of the one or more data packets not correctly decoded. The receiving device may further include means for receiving, from the transmitting device, a retransmission of the one or more parity packets, wherein recovery of the one or more data packets is further based on the received retransmission of the one or more parity packets. The receiving device may also include means for reordering the plurality of data packets based on the recovered one or more data packets, the reordering including waiting for the retransmission of the one or more parity packets to recover the one or more data packets not correctly decoded prior to reordering the plurality of data packets, and means for sending the reordered plurality of data packets to a higher layer.

In another aspect of the disclosure, a processor-readable storage medium having one or more instructions which, when executed by at least one processing circuit, cause the at least one processing circuit to receive, from a transmitting device, a plurality of data packets, detect that one or more data packets of the plurality of data packets was not correctly decoded, transmit, to the transmitting device, information indicating that the one or more data packets was not correctly decoded and/or a number of the one or more data packets that was not correctly decoded, receive, from the transmitting device, one or more parity packets for recovering the one or more data packets not correctly decoded, and decode the one or more parity packets and recover the one or more data packets not correctly decoded based on the decoded one or more parity packets without receiving a retransmission of the one or more data packets not correctly decoded. The one or more instructions further cause the at least one processing circuit to receive, from the transmitting device, a retransmission of the one or more parity packets, wherein recovery of the one or more data packets is further based on the received retransmission of the one or more parity packets. The one or more instructions further cause the at least processing circuit to reorder the plurality of data packets based on the recovered one or more data packets, the reordering including waiting for the retransmission of the one or more parity packets to recover the one or more data packets not correctly decoded prior to reordering the plurality of data packets, and send the reordered plurality of data packets to a higher layer.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

The various concepts presented throughout this disclosure may be implemented across a broad variety of telecommunication systems, network architectures, and communication standards.

Exemplary Operating Environment

Figure 1:
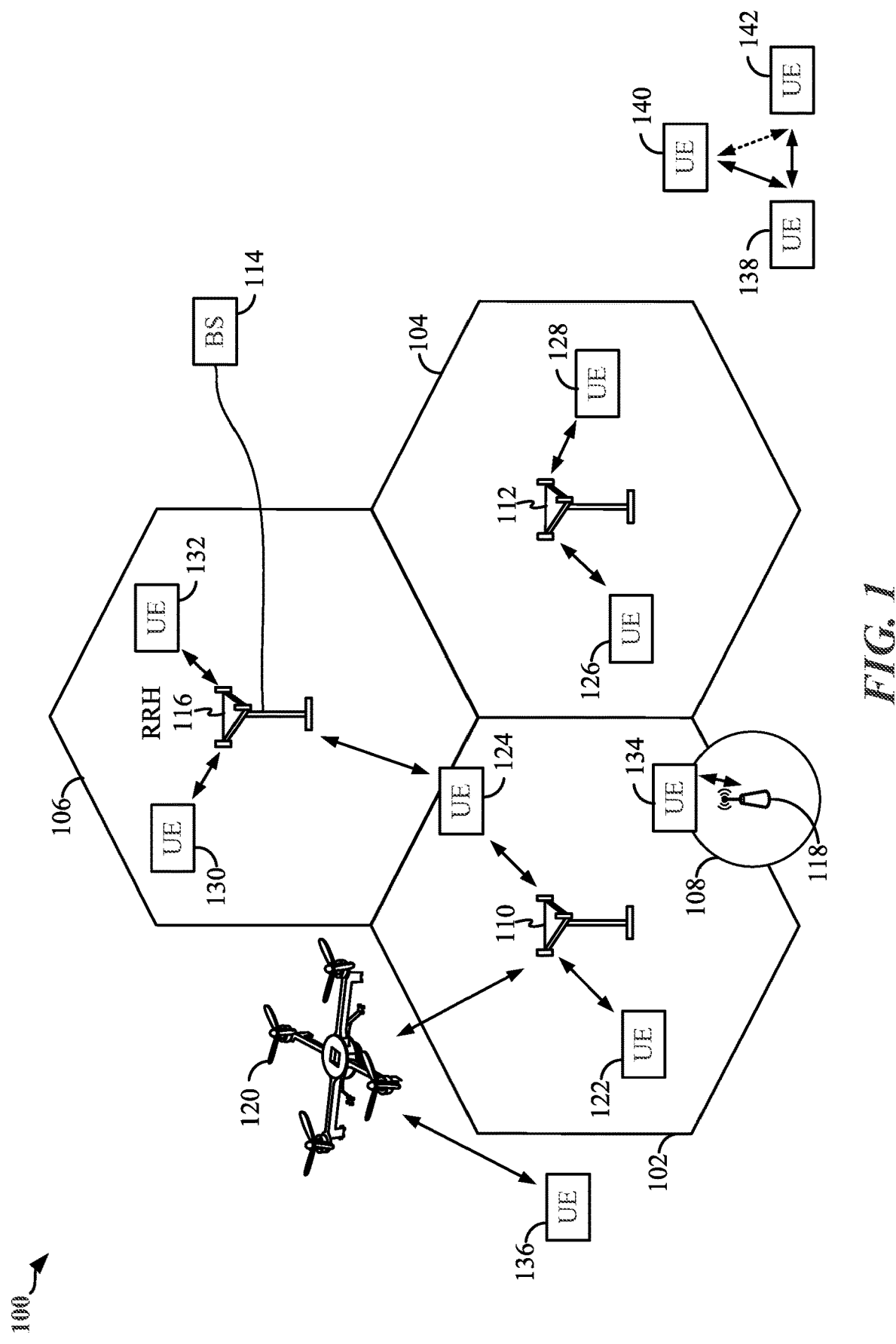
FIG. 1 is a diagram illustrating an example of a network architecture.

FIG. 1 is a diagram illustrating a simplified schematic example of an access network 100. The geographic region covered by the access network 100 may be divided into a number of cellular regions (cells), including macrocells 102, 104, and 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B, an eNode B, or some other suitable terminology.

In FIG. 1, two high-power base stations 110 and 112 are shown in cells 102 and 104, and a third high-power base station 114 is shown controlling a remote radio head (RRH) 116 in cell 106. In this example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, the quadcopter 120 may be configured to function as a UE. For example, the quadcopter 120 may operate within cell 102 by communicating with base station 110.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), or other suitable multiplexing schemes.

Within the access network 100, during a call with a scheduling entity, or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). For example, UE 138 is illustrated communicating with UEs 140 and 142. In this example, the UE 138 is functioning as a scheduling entity, and UEs 140 and 142 utilize resources scheduled by the UE 138 for wireless communication. A UE may function as a scheduling entity in a peer-to-peer (P2P)

network, and/or in a mesh network. In a mesh network example, UEs 140 and 142 may optionally communicate directly with one another in addition to communicating with the scheduling entity 138.

Figure 2:
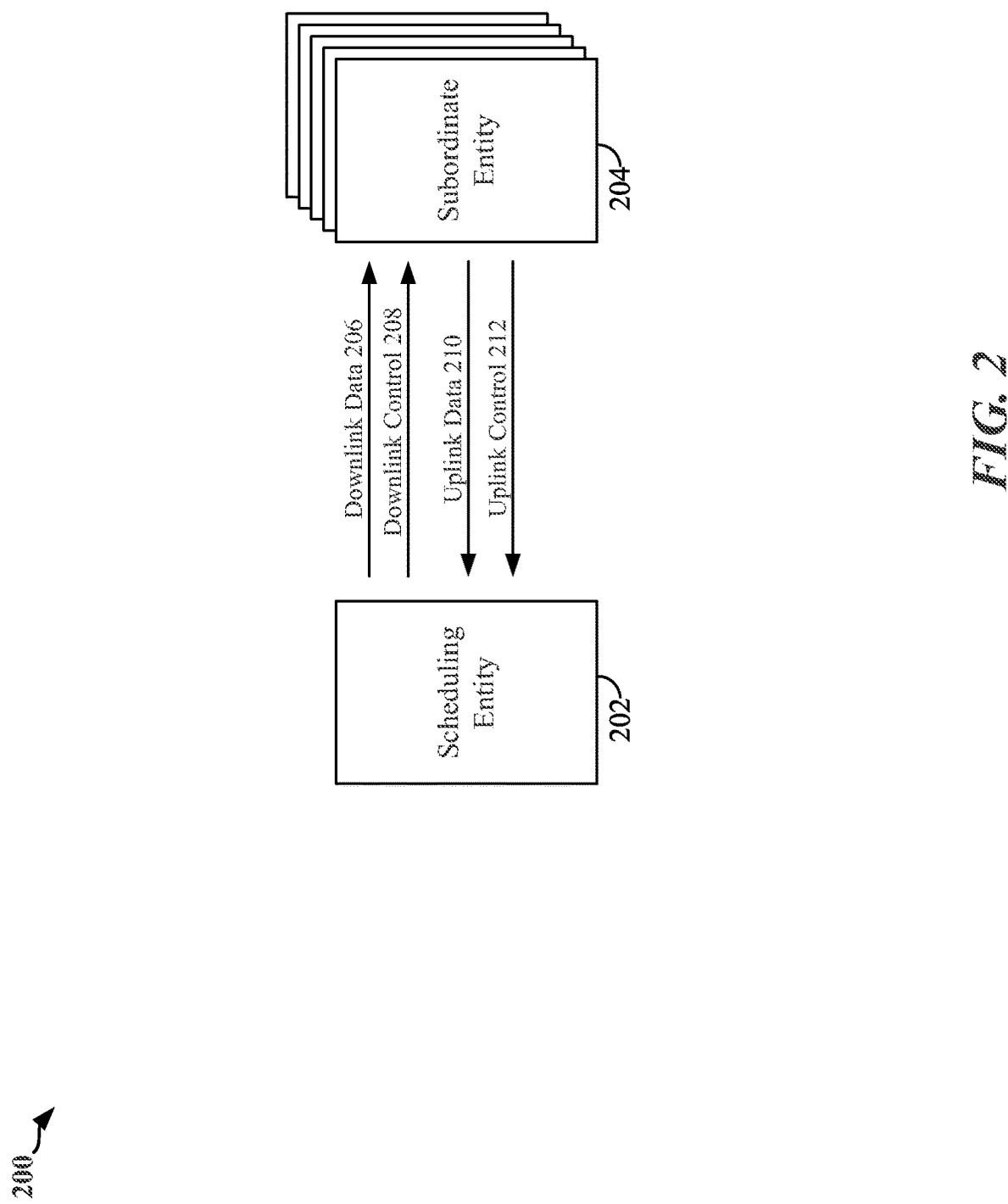
FIG. 2 is a block diagram conceptually illustrating an example of a scheduling entity communicating with one or more subordinate entities according to some embodiments.

Thus, in a wireless communication network with a scheduled access to time-frequency resources and having a cellular configuration, a P2P configuration, and a mesh configuration, a scheduling entity and one or more subordinate entities may communicate utilizing the scheduled resources. Referring now to FIG. 2, a block diagram illustrates a scheduling entity 202 and a plurality of subordinate entities 204. Here, the scheduling entity 202 may correspond to the base stations 110, 112, 114, and 118. In additional examples, the scheduling entity 202 may correspond to the UE 138, the quadcopter 120, or any other suitable node in the access network 100. Similarly, in various examples, the subordinate entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast data 206 to one or more subordinate entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. Another way to describe the system may be to use the term broadcast channel multiplexing. In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network such as the scheduling entity 202.

The scheduling entity 202 may broadcast a control channel 208 to one or more subordinate entities 204. Uplink data 210 and/or downlink data 206 may be transmitted using a transmission time interval (TTI). Here, a TTI may correspond to an encapsulated set or packet of information capable of being independently decoded. In various examples, TTIs may correspond to frames, subframes, data blocks, time slots, or other suitable groupings of bits for transmission.

Furthermore, the subordinate entities 204 may transmit uplink control information 212 to the scheduling entity 202. Uplink control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit in the downlink control channel 208 information that may schedule the TTI for uplink packets. In a further example, the uplink control channel 212 may include hybrid automatic repeat request (HARQ) feedback transmissions, such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

The channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other data, control, and feedback channels.

Figure 3:
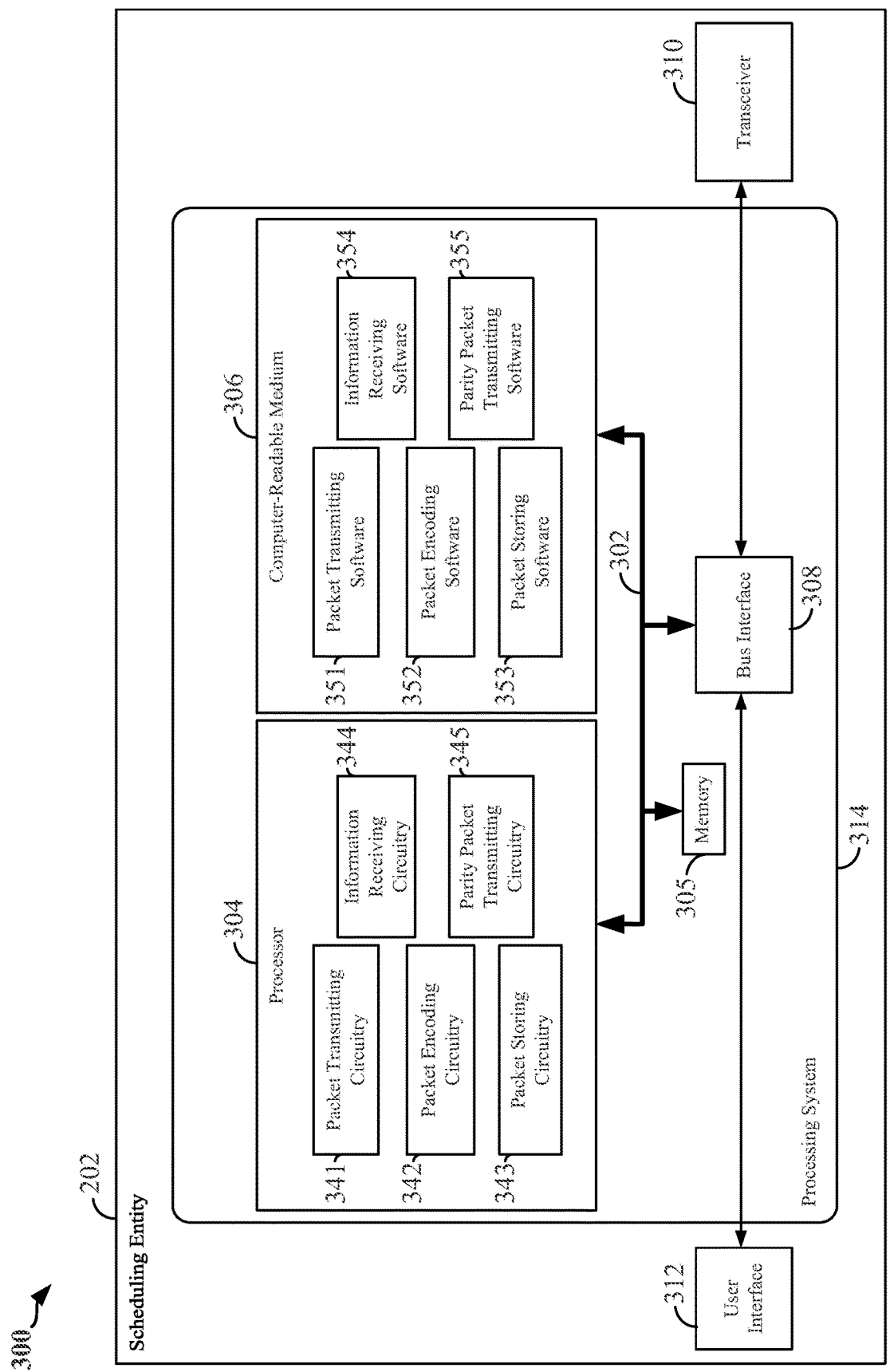
FIG. 3 is a block diagram illustrating an example of a hardware implementation for a scheduling entity employing a processing system according to some embodiments.

FIG. 3 is a conceptual diagram 300 illustrating an example of a hardware implementation for an exemplary scheduling entity 202 employing a processing system 314. In accordance with various aspects of the disclosure, an element, or any portion of an element, or any combination of elements may be implemented with a processing system 314 that includes one or more processors 304.

In various aspects of the disclosure, the scheduling entity 202 may be any suitable radio transceiver apparatus, and in some examples, may be embodied in a base station (BS), such as a base station 104 or a base station 108 of FIG. 1, a base transceiver station (BTS), a radio base station, a radio transceiver, a transceiver function, a basic service set (BSS), an extended service set (ESS), an access point (AP), a Node B, an eNode B (eNB), mesh node, relay, or some other suitable terminology. A base station may provide wireless access points to a core network for any number of user equipment (UE).

In other examples, the scheduling entity 202 may be embodied in a wireless UE. Examples of a UE include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, an entertainment device, a vehicle component, a wearable computing device (e.g., a smart watch, a health or fitness tracker, etc.), an appliance, a sensor, a vending machine, or any other similar functioning device. The UE may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 304, as utilized in a scheduling entity 202, may be used to implement any one or more of the processes described below.

In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

In some aspects of the disclosure, the processor 304 may include packet transmitting circuitry 341, configured to transmit a plurality of data packets to a receiving device and retransmit, to the receiving device, one or more data packets not correctly decoded at the receiving device. The packet transmitting circuitry 341 may operate in coordination with packet transmitting software 351. The processor 304 may further include packet encoding circuitry 342, configured to encode the plurality of transmitted data packets to generate one or more parity packets. The packet encoding circuitry 342 may operate in coordination with packet encoding software 352. The processor 304 may further include packet storing circuitry 343, configured to store the one or more parity packets in a retransmission buffer. The packet storing circuitry 343 may operate in coordination with packet storing software 353. The processor 304 may further include information receiving circuitry 344, configured to receive, from the receiving device, information indicating that one or more transmitted data packets was not correctly decoded and/or a number of the one or more transmitted data packets that was not correctly decoded. The information receiving circuitry 344 may operate in coordination with information receiving software 354. The processor 304 may further include parity packet transmitting circuitry 345, configured to transmit/retransmit, to the receiving device, the one or more parity packets stored in the retransmission buffer for recovering the one or more transmitted data packets not correctly decoded without retransmitting the one or more transmitted data packets not correctly decoded. The parity packet transmitting circuitry 345 may operate in coordination with parity packet transmitting software 355.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 4:
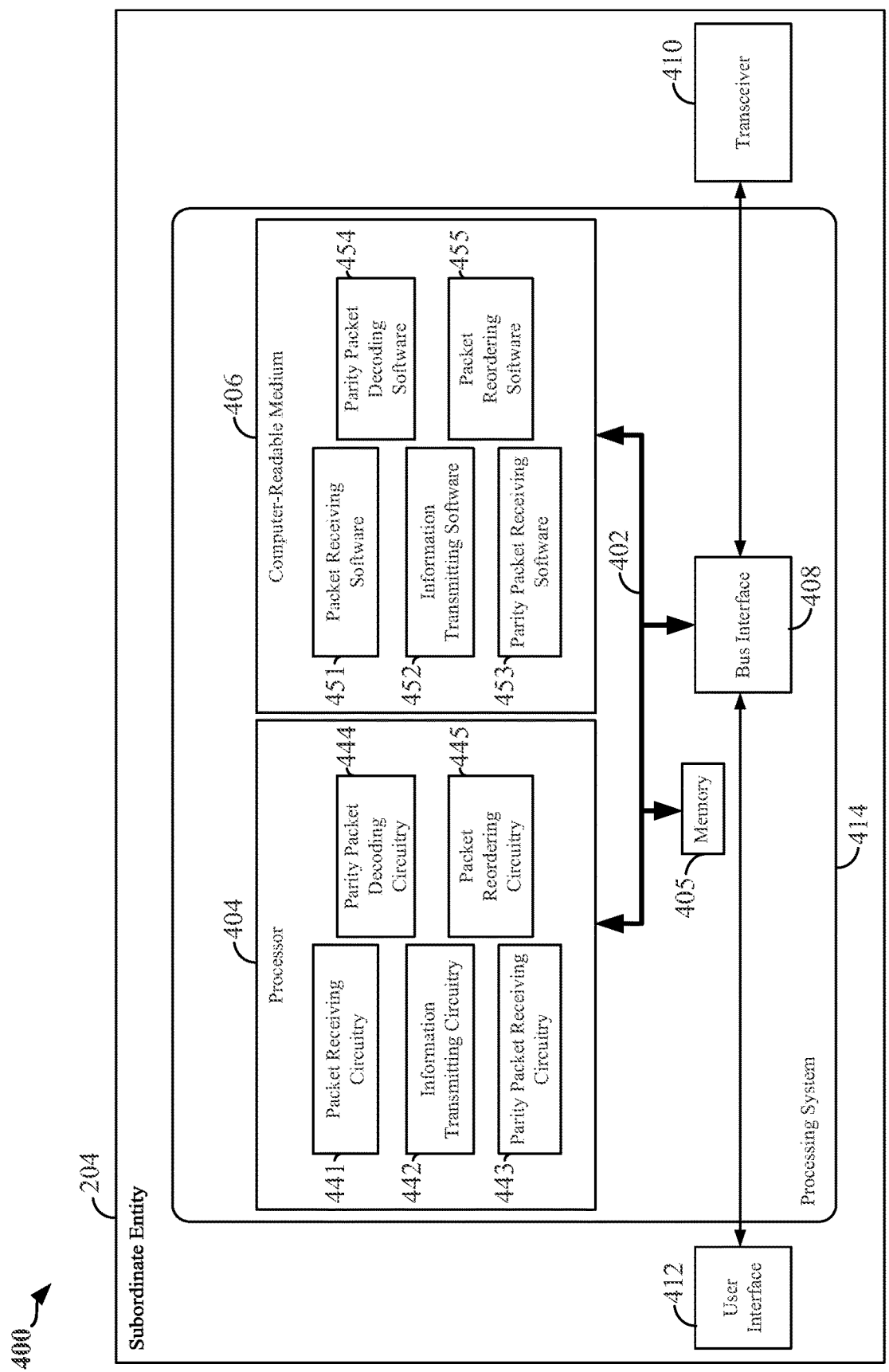
FIG. 4 is a block diagram illustrating an example of a hardware implementation for a subordinate entity employing a processing system according to some embodiments.

FIG. 4 is a conceptual diagram 400 illustrating an example of a hardware implementation for an exemplary subordinate entity 204 employing a processing system 414. In accordance with various aspects of the disclosure, an element, or any portion of an element, or any combination of elements may be implemented with a processing system 414 that includes one or more processors 404.

The processing system 414 may be substantially the same as the processing system 314 illustrated in FIG. 3, including a bus interface 408, a bus 402, memory 405, a processor 404, and a computer-readable medium 406. Furthermore, the subordinate entity 204 may include a user interface 412 and a transceiver 410 substantially similar to those described above in FIG. 3.

In some aspects of the disclosure, the processor 404 may include packet receiving circuitry 441, configured to receive a plurality of data packets from a transmitting device, detect that one or more data packets of the plurality of data packets was not correctly decoded, and receive a retransmission of the one or more data packets not correctly decoded from the transmitting device. The packet receiving circuitry 441 may operate in coordination with packet receiving software 451. The processor 404 may further include information transmitting circuitry 442, configured to transmit, to the transmitting device, information indicating that the one or more data packets was not correctly decoded and/or a number of the one or more data packets that was not correctly decoded. The information transmitting circuitry 442 may operate in coordination with information transmitting software 452. The processor 404 may also include parity packet receiving circuitry 443, configured to receive, from the transmitting device, one or more parity packets for recovering the one or more data packets not correctly decoded. The parity packet receiving circuitry 443 may operate in coordination with parity packet receiving software 453. The processor 404 may further include parity packet decoding circuitry 444, configured to decode the one or more parity packets and recover the one or more data packets not correctly decoded based on the decoded one or more parity packets without receiving a retransmission of the one or more data packets not correctly decoded. The parity packet decoding circuitry 444 may operate in coordination with parity packet decoding software 454. The processor 404 may also include packet reordering circuitry 445, configured to reorder the plurality of data packets based on the recovered one or more data packets and send the reordered plurality of data packets to a higher protocol layer for further processing. The packet reordering circuitry 445 may operate in coordination with packet reordering software 455.

Figure 5:
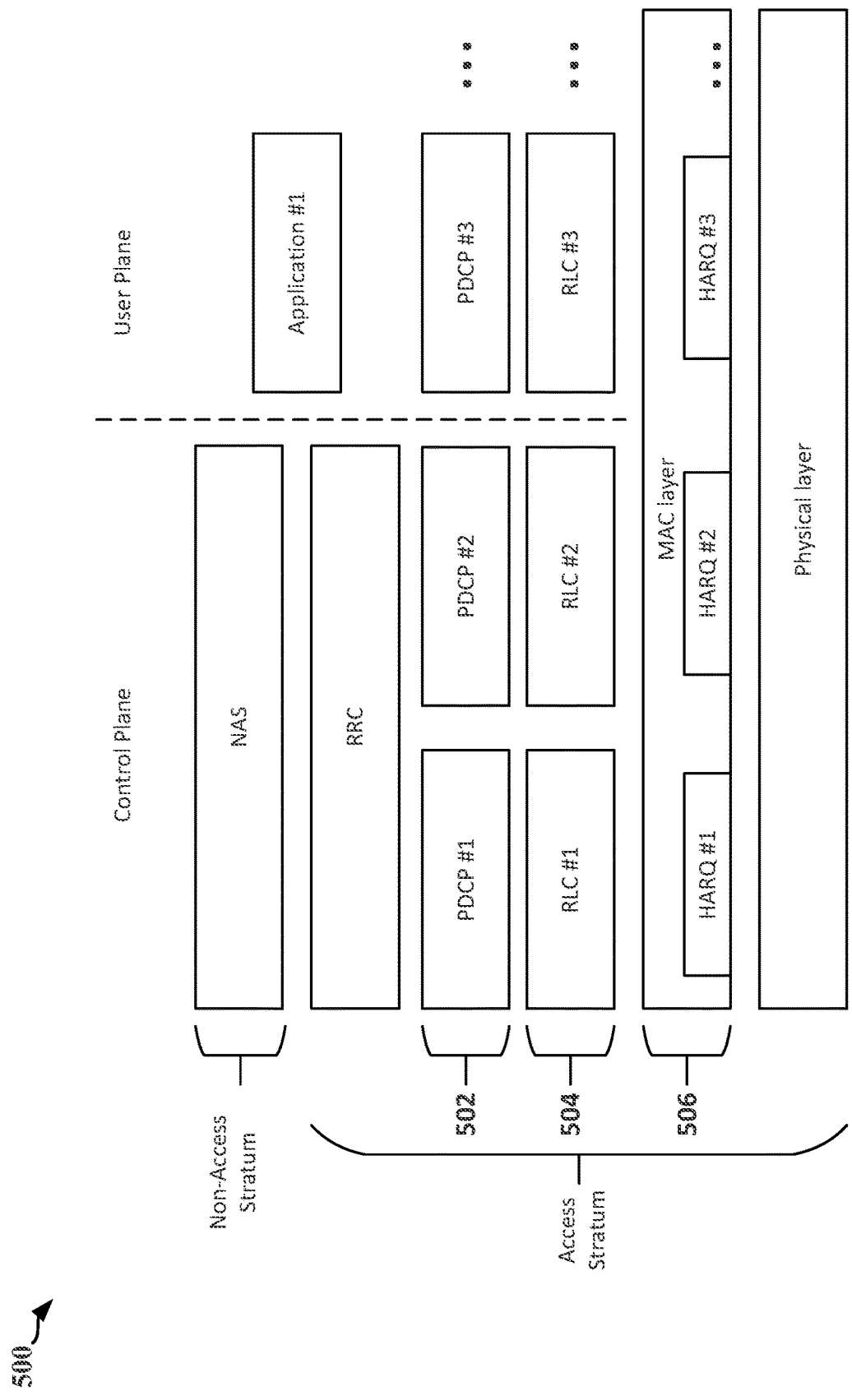
FIG. 5 is a diagram illustrating an overview of a user-plane protocol architecture.

Exemplary Description of Retransmitting Data in a Wireless Communication Network FIG. 5 is a diagram illustrating an overview of a user-plane protocol architecture 500. The architecture 500 includes a packet data convergence protocol (PDCP) layer 502, a radio link control (RLC) layer 504, and a medium access control (MAC) layer 506.

The PDCP layer 502 processes radio resource control (RRC) messages in the control plane and Internet Protocol (IP) packets in the user plane. Depending on a radio bearer, functions of the PDCP layer 502 may include header compression, security (integrity protection and ciphering), and support for reordering and retransmission during handover. For radio bearers, there may be one PDCP entity per radio bearer.

The RLC layer 504 segments and reassembles upper layer packets in order to adapt them to a size that can be transmitted over a radio interface. For radio bearers that need error-free transmission, the RLC layer 504 also performs retransmission to recover from packet losses. The RLC layer 504 could additionally perform reordering to compensate for out-of-order reception due to a Hybrid Automatic Repeat request (HARQ) operation in the layer below. There may be one RLC entity per radio bearer.

The MAC layer 506 multiplexes data from different radio bearers.

Therefore, there may be one MAC entity per UE. The MAC layer 506 aims to achieve a negotiated Quality of Service (QoS) for each radio bearer by deciding an amount of data that can be transmitted from each radio bearer and instructing the RLC layer 504 as to the size of the packets to provide.

At a transmitting side, each layer receives a Service Data Unit (SDU) from a higher layer, for which the layer provides a service, and outputs a Protocol Data Unit (PDU) to the layer below. The RLC layer 504 receives packets from the PDCP layer 502. These packets may be referred to as PDCP PDUs from a PDCP point of view and represent RLC SDUs from an RLC point of view. The RLC layer 504 creates packets which are provided to the MAC layer 506 below. The packets provided by the RLC layer 504 to the MAC layer 506 are RLC PDUs from an RLC point of view and MAC SDUs from a MAC point of view. At the receiving side, the process is reversed, with each layer passing SDUs up to the layer above, where they are received as PDUs.

The RLC layer 504 communicates with the PDCP layer 502 through a Service Access Point (SAP) and with the MAC layer 506 via logical channels. The RLC layer 504 reformats PDCP PDUs in order to fit them into the size indicated by the MAC layer 506. That is, the RLC layer 504 at the transmitting side segments and/or concatenates the PDCP PDUs and the RLC layer 504 at the receiving side reassembles the RLC PDUs to reconstruct the PDCP PDUs. In addition, the RLC layer 504 may reorder the RLC PDUs if they are received out of sequence due to the HARQ operation performed in the MAC layer 506.

The functions of the RLC layer 504 are performed by RLC entities (e.g., RLC #1, RLC #2, RLC #3, etc.). An RLC entity may be configured in one of three data transmission modes: Transparent Mode (TM), Unacknowledged Mode (UM), and Acknowledged Mode (AM). In AM, special functions are defined to support retransmission.

Figure 6:
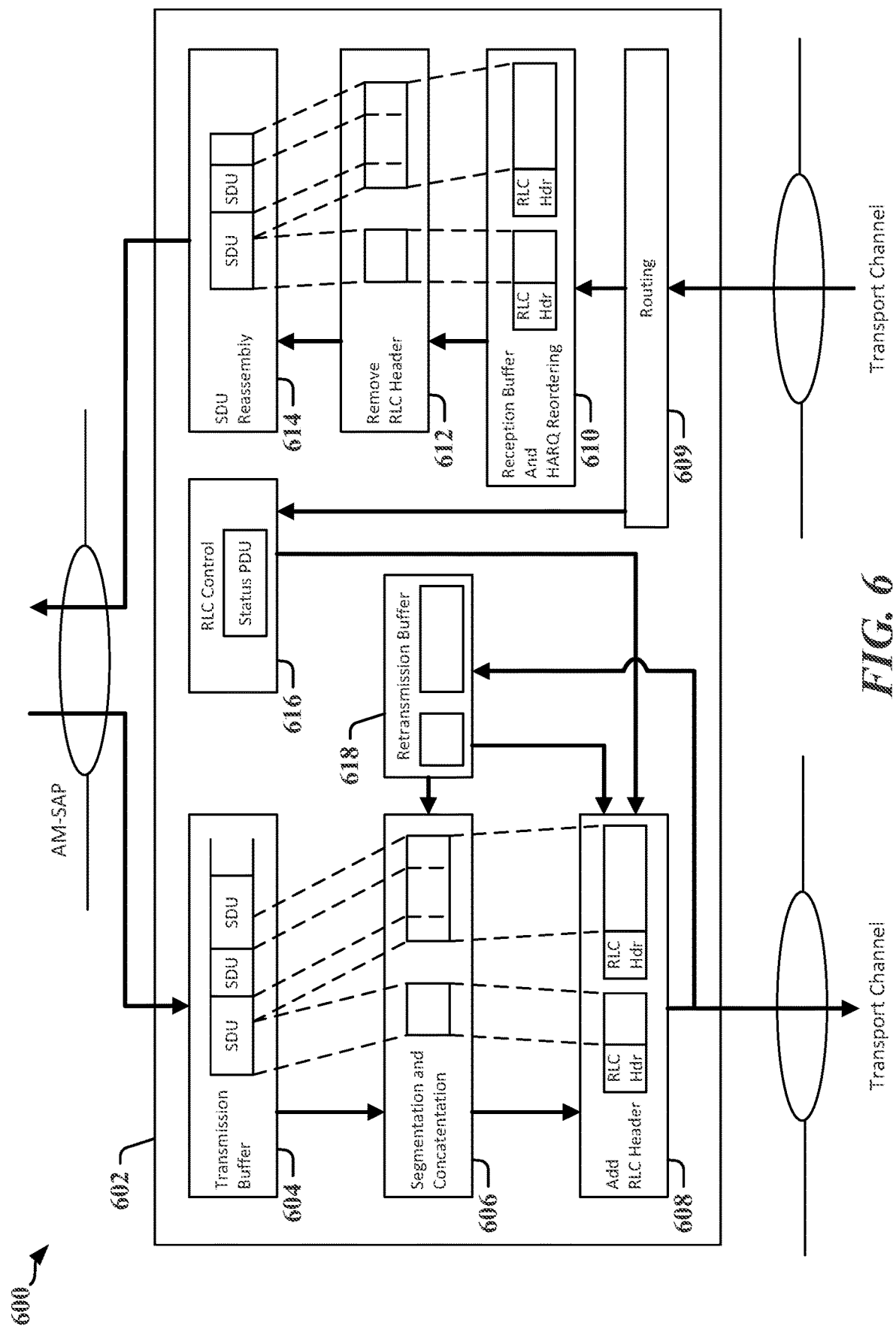
FIG. 6 is a block diagram illustrating an AM RLC entity providing a bidirectional data transfer service.

FIG. 6 is a block diagram 600 illustrating an AM RLC entity 602. The AM RLC entity 602 provides a bidirectional data transfer service. Therefore, a single AM RLC entity 602 is able to transmit and receive. Parts of the AM RLC entity 602 configured to transmit data may be referred to as a transmitting side while parts of the AM RLC entity 602 configured to receive data may be referred to as a receiving side.

The AM RLC entity 602 supports the retransmission of data. An ARQ operation may be performed to support error-free transmission. Transmission errors may be corrected by performing retransmissions. The AMC RLC entity 602 may be utilized by error-sensitive and delay-tolerant applications, such as interactive/background type services (e.g., web browsing and file downloading) and streaming-type services, for example.

At the transmitting side, the AM RLC entity 602 receives RLC SDUs from upper layers (e.g., PDCP layer) via an AM service access point (AM-SAP) and may store the RLC SDUs in a transmission buffer 604. The AM RLC entity 602 then performs segmentation and/or concatenation 606 of the RLC SDUs to form RLC PDUs. The size of an RLC PDU at each transmission opportunity may be decided and notified by a MAC layer depending on radio channel conditions and available transmission resources. Therefore, the size of each transmitted RLC PDU can be different. After segmentation and/or concatenation, the AM RLC entity 602 adds relevant RLC headers 608 to the RLC PDUs to indicate the sequence number of an RLC PDU and the size and boundary of each included RLC SDU or RLC SDU segment. The RLC PDUs are then transferred to a lower layer (e.g., MAC layer) via a transport channel for further processing.

At the receiving side, a reception buffer 610 receives RLC PDUs from a lower layer (e.g., MAC layer) via a transport channel through a routing entity 609. The reception buffer 610 reorders the RLC PDUs if they are received out of sequence. Out-of-sequence reception may be due to the MAC layer performing a HARQ operation using multiple HARQ processes. Any RLC PDUs received out of sequence may be stored in the reception buffer 610 until all previous RLC PDUs are received and delivered to an upper layer. The AM RLC entity 602 removes RLC headers 612 from the RLC PDUs stored in the reception buffer 610 and may begin reassembly 614 of RLC SDUs. Reassembly may be performed on an RLC SDU basis. Hence, only RLC SDUs for which all segments are available are reassembled from the stored RLC PDUs and delivered to the upper layer. RLC SDUs that have at least one missing segment may be discarded and not reassembled. If RLC SDUs were concatenated in an RLC PDU, a reassembly function 614 may separate them into their original RLC SDUs. The AM RLC entity 602 may deliver reassembled RLC SDUs to the upper layer in increasing order of sequence numbers.

As noted above, the AM RLC entity 602 supports the retransmission of data. In order that the transmitting side retransmits only missing RLC PDUs, the receiving side may provide a status report to the transmitting side indicating ACK and/or NACK information for the RLC PDUs. For example, the routing entity 609 may receive a status report, in the form of a status PDU, indicating ACK or NACK for a transmitted RLC PDU. The status report may be transmitted from a transmitting side of another AM RLC entity whose receiving side received corresponding RLC PDUs. The routing entity 609 may provide the status PDU to an RLC control 616. Based on the status PDU, the transmitting side may perform a retransmission of a corresponding RLC PDU.

When the transmitting side originally transmits RLC PDUs, the transmitted RLC PDUs may be stored in a retransmission buffer 618 for possible retransmission if requested by a receiver through a status report. In case of retransmission, the transmitting side can resegment the original RLC PDUs into smaller PDU segments if the MAC layer indicates a size that is smaller than the original RLC PDU size.

According to aspects of the disclosure, packet coding may be implemented at the MAC layer, RLC layer, and/or PDCP layer to improve a reliability of a communication link and optimize a cost in terms of buffering requirements at these layers. Previous retransmission schemes proved to be costly (e.g., large buffering requirements) for large bandwidth and low latency cases. Accordingly, the present disclosure provides a novel retransmission scheme that utilizes coding to increase packet reception reliability and optimizes a retransmission buffer size at a transmitting device and a reception buffer size and a reordering buffer size at a receiving device.

According to a previous retransmission scheme, from a transmitting device point of view, data packets residing in a transmission buffer are transmitted to a receiving device. All transmitted data packets are stored in a retransmission buffer for potential retransmission in case any one of the transmitted data packets is not decoded (or correctly received) at the receiving device. For example, when the data packets are initially transmitted, the receiving device may not be able to decode (or correctly receive) one or more of the data packets due to a data packet being lost, transmission error, interference, etc. Accordingly, the receiving device may provide information to the transmitting device indicating that the data packet was not decoded. For example, the information may be a status report/status PDU indicating a negative acknowledgment (NACK) for the data packet or indicating how many data packets are missing. In response to the received information, the transmitting device may retransmit from the retransmission buffer the data packet not decoded at the receiving device.

In the previous retransmission scheme, because all transmitted data packets are stored in the retransmission buffer for potential retransmission, the previous retransmission scheme requires a large retransmission buffer for large bandwidth and low latency cases. This is problematic as the cost of the large retransmission buffer may affect throughput.

To address this problem, an aspect of the present disclosure provides a novel retransmission scheme where not all transmitted data packets are stored in the retransmission buffer. For example, instead of buffering all the transmitted data packets (e.g., RLC/PDCP PDUs) for potential retransmission, the transmitting device may encode the transmitted data packets, expected to be transmitted within a single batch or across multiple batches, to generate one or more parity packets (e.g., redundant RLC PDUs). The one or more parity packets are then stored in the retransmission buffer, thus significantly reducing the size of the retransmission buffer. If the transmitting device receives information (e.g., NACK) indicating that transmitted data packets were not decoded (or correctly received) at a receiving device, thus requiring retransmission (e.g., RLC retransmission), then the transmitting device may transmit to the receiving device parity packets to recover the data packets not decoded. Upon receipt, the receiving device may decode the parity packets and further use the parity packets and decoded systematic packets to recover the data packets.

In an aspect of the disclosure, a PDCP layer may encode data packets from different transport blocks to facilitate transmit diversity. As an example, for a given sequence of PDUs, e.g., PDUs 1, 2, 3, 4, 5, and 6, a MAC layer may transmit the PDUs 1, 2, and 3 in a first batch and the PDUs 4, 5, and 6 in a second batch. Moreover, the PDCP layer may encode the PDUs 1 and 4 to generate a first parity packet associated with the PDUs 1 and 4, encode the PDUs 2 and 5 to generate a second parity packet associated with the PDUs 2 and 5, and encode the PDUs 3 and 6 to generate a third parity packet associated with the PDUs 3 and 6.

In an aspect of the disclosure, the transmitting device may retransmit the data packet not decoded in one interlace while transmitting the parity packets associated with the data packet not decoded in other interlaces. This increases the chance of the receiving device successfully decoding (or correctly receiving) the data packet. Accordingly, the novel retransmission scheme supports high throughput while achieving high transmission reliability.

In an aspect of the disclosure, from the receiving device point of view, the transmission of the parity packet in other interlaces controls the increase of a reordering buffer size at the receiving device. The parity packet transmission(s) essentially throttles down new transmission data throughput. That is, the parity packet transmission(s) regulates the amount of new data transmissions that come into the reordering buffer, thus reducing the reordering buffer size. In a further aspect of the disclosure, because the parity packet may be transmitted in other interlaces, more redundancy versions of the data packet not decoded may be received by the receiving device. This increases the chance of decoding (correctly receiving) the data packet, and decoding the data packet at an earlier time. Accordingly, the novel retransmission scheme further supports high reception reliability as well as reduces buffer requirements at the receiving device.

In an aspect of the disclosure, the retransmission buffer may be located in the RLC layer of the transmitting device. In another aspect of the disclosure, packet encoding may be performed at the MAC layer of the transmitting device and packet decoding may be performed at the MAC layer of the receiving device. For example, the MAC layer may define the coding regarding what parity packets are involved and how the parity packets are retransmitted.

In a further aspect of the disclosure, packet reordering may be performed by the MAC layer or a higher layer, such as the RLC layer or the PDCP layer, of the receiving device. Hence, the reordering buffer may be located in the PDCP layer. Coding performed at the MAC layer reduces PDCP layer reordering buffer requirements.

In an aspect of the disclosure, an unknown retransmission may be budgeted for an undetected NACK to ACK error. The receiving device may send a physical (PHY) layer ACK per a self-contained transmission time interval (TTI). The receiving device may send a MAC layer ACK with higher reliability per a longer interval (e.g., every 10 ms, etc.). MAC layer retransmission/coding may be used to recover packets lost (not decoded) due to NACK to ACK error.

In an aspect of the disclosure, the above-described coding may be implemented across multiple links at the PDCP layer to reduce both transmitting device and receiving device buffer requirements.

Coding across multiple links at the PDCP layer may help significantly reduce latency in case one of the links experiences link failure, link outage, severe jamming, etc. Redundant packets sent over other links help recover packets stalled in the transmission buffer of the failed link. This helps reduce latency, and at the same time, reduce a receiving side reordering buffer requirement due to fast recovery using the parity packets from the other links. Also, storing the parity packets instead of storing all the data packets at the transmitting side helps reduce a retransmission buffer size.

In an aspect of the disclosure, a PHY layer code block length design may be linked to a size of a data packet (e.g., MAC/RLC PDU). Accordingly, the PHY layer may use a unified code block size to facilitate coding and retransmission. For example, re-segmentation of a transport block (TB) with the same code block size may be simplified by maintaining the same code blocks but repacking the code blocks to attain a new transport block and adjusting a modulation and coding scheme (MCS) to achieve a link adaptation purpose. In an aspect of the disclosure, a data packet (e.g., MAC/RLC PDU) may be segmented to match a unified code block size to facilitate coding and retransmission. Accordingly, resegmentation of a code block size may not be necessary due to the existence of a default (unified) block size to abide by.

According to further aspects of the disclosure, a coding/retransmission design at the PDCP layer and its relationship with reordering will be discussed below. Such design may include retransmission without coding, coding and retransmitting parity packets, and forward error correction (FEC) only (e.g., fixed coding overhead regardless of feedback). Notably, coding and retransmission occur at one layer (MAC/RLC layer or PDCP layer), while reordering occurs at a higher layer, which would benefit from the retransmission/coding from a lower layer.

Figure 7:
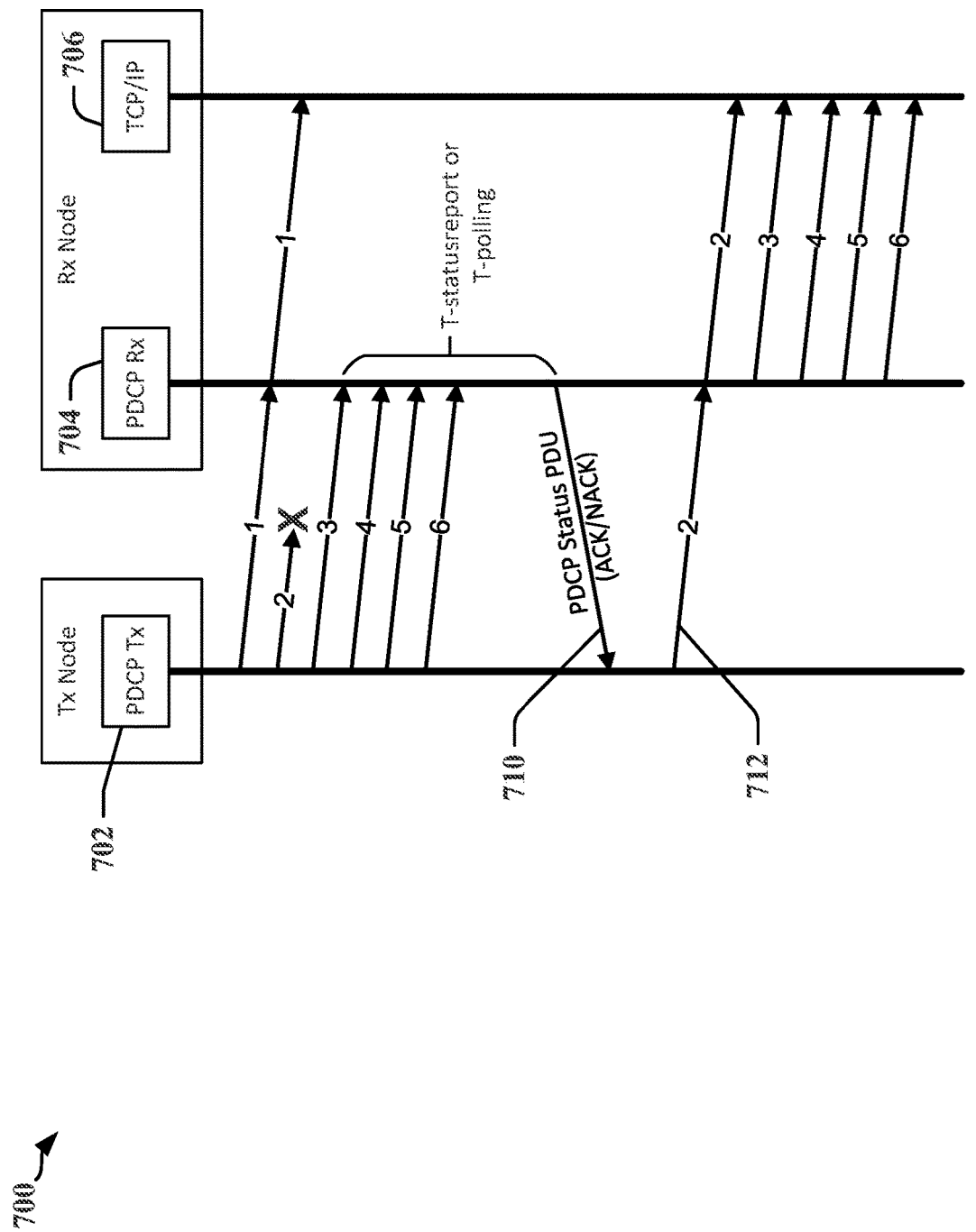
FIG. 7 is a diagram illustrating PDCP reliability via an ACK/NACK triggered retransmission.

FIG. 7 is a diagram 700 illustrating PDCP reliability via an ACK/NACK triggered retransmission. The scheme depicted in FIG. 7 is similar to a retransmission scheme in a legacy RLC acknowledged mode (AM) system. Here, a PDCP sender (PDCP Tx) 702 transmits a sequence of PDUs, e.g., PDUs 1, 2, 3, 4, 5, and 6, to a PDCP receiver (PDCP Rx) 704. The PDCP Tx 702 stores the transmitted PDUs 1, 2, 3, 4, 5, and 6 in a retransmission buffer for potential retransmission in case any one of the transmitted PDUs is not decoded or correctly received at the PDCP Rx 704.

Upon decoding or correctly receiving the PDU 1, the PDCP Rx 704 may forward the PDU 1 to a transport control protocol (TCP)/Internet protocol (IP) layer 706. If one of the PDUs in the sequence, e.g., the PDU 2, is not decoded or correctly received at the PDCP Rx 704, then such PDU cannot be forwarded to the TCP/IP layer 706. Moreover, the PDUs 3, 4, 5, and 6 that are decoded or correctly received at the PDCP Rx 704 out of sequence with respect to the PDU 2, may not be forwarded to the TCP/IP 706 until the PDCP Rx 704 decodes or correctly receives a retransmission of the PDU 2. The PDUs 3, 4, 5, and 6 received out of sequence may be stored in a reordering buffer until the sequentially previous PDU 2 is received and delivered to the TCP/IP layer 706.

The PDCP Rx 704 may activate a timer upon detecting that the PDU 2 was not decoded or correctly received. Upon expiration of a timer duration (e.g., T-statusreport or T-polling), the PDCP Rx 704 may send a PDCP status PDU (ACK/NACK) 710 to the PDCP Tx 702. The PDCP status PDU 710 indicates the failure to decode or correctly receive the PDU 2. Upon receiving the PDCP status PDU 710, the PDCP Tx 702 learns that the PDU 2 was not correctly received at the PDCP Rx 704 and is triggered to retransmit 712 the PDU 2 to the PDCP Rx 704. The PDCP Rx 704 may then successfully decode the retransmission of the PDU 2, and thereafter, forward the PDU 2 and the previously decoded PDUs 3, 4, 5, and 6 to the TCP/IP layer 706.

In an aspect of the disclosure, the timer duration (e.g., T-statusreport or T-polling) may be a function of a PDCP round trip time (RTT). A reordering buffer size at the PDCP Rx 704 may depend on the T-statusreport or T-polling. Accordingly, the scheme depicted in FIG. 7 wastes no time due to extra transmissions and has no encoding/decoding overhead.

Figure 8:
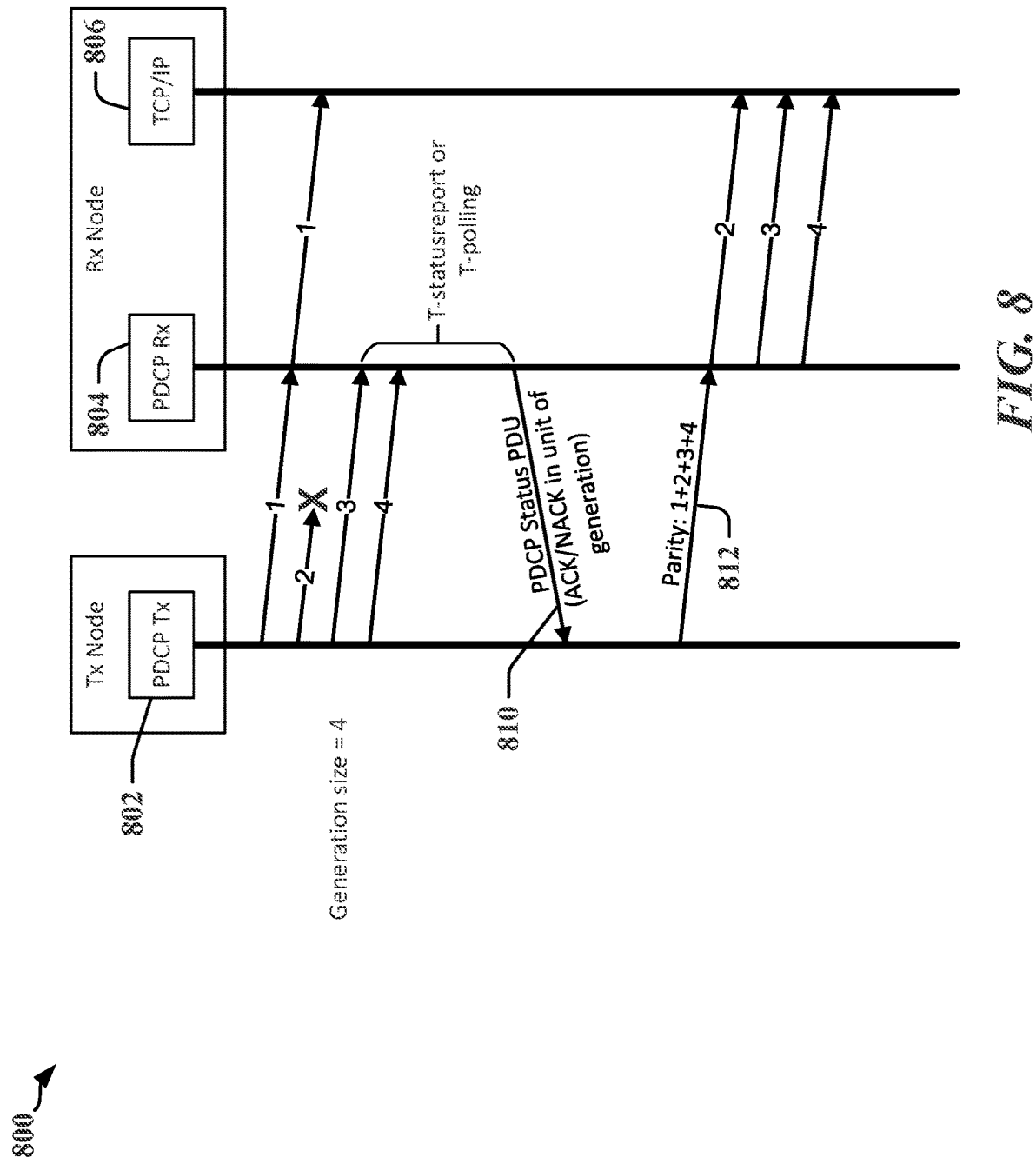
FIG. 8 is a diagram illustrating PDCP reliability via a parity-based retransmission.

FIG. 8 is a diagram 800 illustrating PDCP reliability via a parity-based retransmission. Here, a PDCP sender (PDCP Tx) 802 transmits a sequence of PDUs, e.g., PDUs 1, 2, 3, and 4, to a PDCP receiver (PDCP Rx) 804. Unlike the PDCP Tx 702 of FIG. 7, which stores the transmitted PDUs is a retransmission buffer for potential retransmission, the PDCP Tx 802 of FIG. 8 encodes the sequence of transmitted PDUs to generate one or more parity PDUs and stores the one or more parity PDUs in the retransmission buffer. In this example, a generation size for the one or more parity PDUs=4 PDUs.

Upon decoding or correctly receiving the PDU 1, the PDCP Rx 804 may forward the PDU 1 to a transport control protocol (TCP)/Internet protocol (IP) layer 806. If one of the PDUs in the sequence, e.g., the PDU 2, is not decoded or correctly received at the PDCP Rx 804, then such PDU cannot be forwarded to the TCP/IP layer 806. Moreover, the PDUs 3 and 4 that are decoded or correctly received at the PDCP Rx 804 out of sequence with respect to the PDU 2, may not be forwarded to the TCP/IP 806 until the PDCP Rx 804 recovers the PDU 2. The PDUs 3 and 4 received out of sequence may be stored in a reordering buffer until the sequentially previous PDU 2 is recovered and delivered to the TCP/IP layer 806.

The PDCP Rx 804 may activate a timer upon detecting that the PDU 2 was not decoded or correctly received. Upon expiration of a timer duration (e.g., T-statusreport or T-polling), the PDCP Rx 804 may send a PDCP status PDU (ACK/NACK) 810 to the PDCP Tx 802. The PDCP status PDU 810 may be in a unit of the generation size and indicates the failure to decode or correctly receive the PDU 2. Upon receiving the PDCP status PDU 810, the PDCP Tx 802 learns that the PDU 2 was not correctly received at the PDCP Rx 804 and is triggered to transmit 812 the one or more parity PDUs stored in the retransmission buffer. The PDCP Rx 804 may decode the one or more parity PDUs and use the decoded one or more parity PDUs to recover the PDU 2. The PDCP Rx 804 may then forward the PDU 2 and the previously decoded PDUs 3 and 4 to the TCP/IP layer 706.

According to the retransmission scheme of FIG. 8, a retransmission buffer cost may be reduced by a factor of K, wherein K=generation size. More generally, if multiple parity PDUs (e.g., P parity PDUs) are used, the buffer cost may be reduced by a factor of K/P. Moreover, the timer duration (e.g., T-statusreport or T-polling) may be a function of a PDCP round trip time (RTT). A reordering buffer size at the PDCP Rx 804 may depend on the T-statusreport or T-polling. Accordingly, the scheme depicted in FIG. 8 wastes no time due to extra transmissions, but requires encoding and decoding. In an aspect of the disclosure, parameters such as the generation size, the timer duration (e.g., T-statusreport or T-polling), and a coding scheme may be configured based on a radio resource control (RRC) message.

Figure 9:
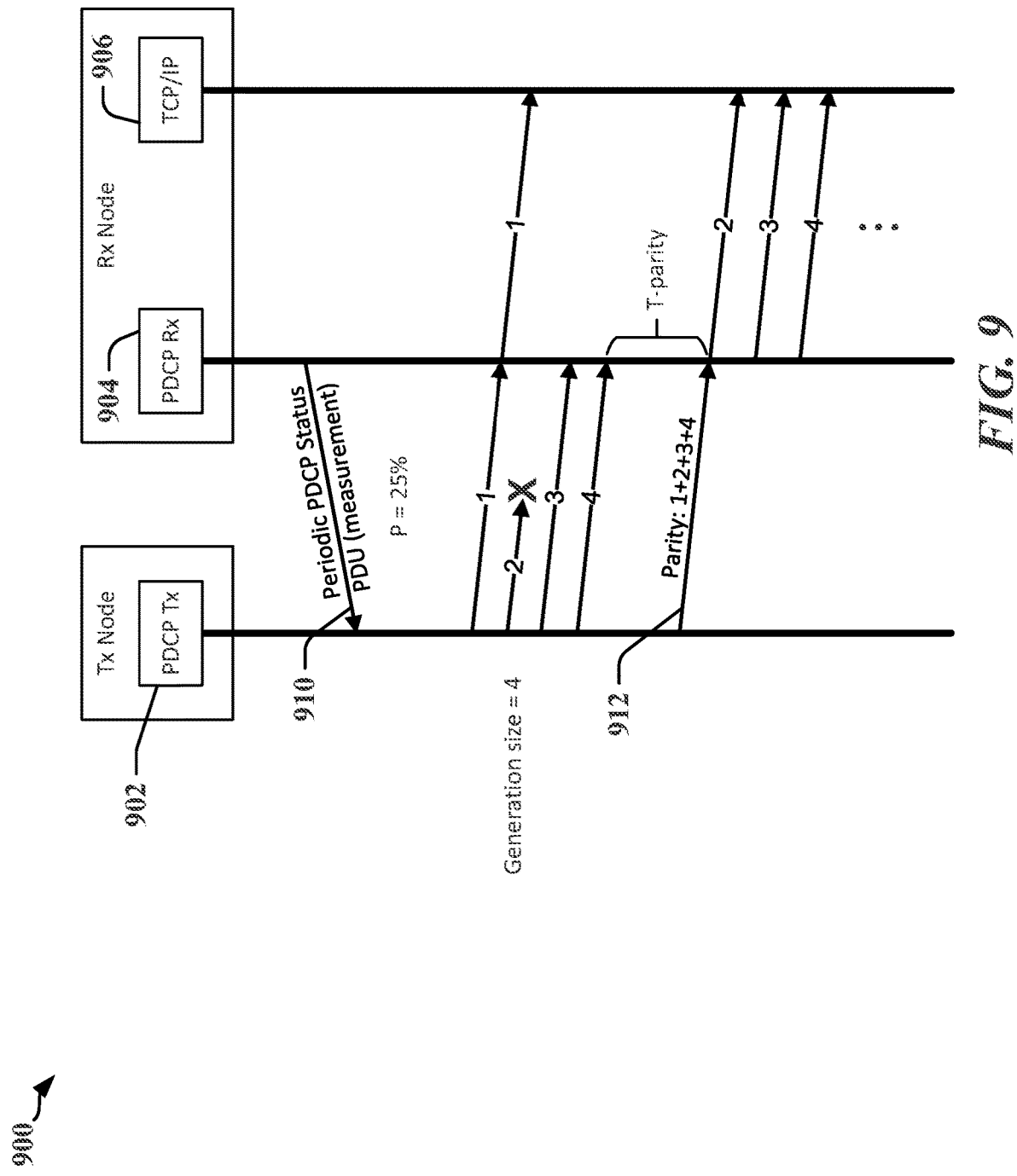
FIG. 9 is a diagram illustrating PDCP reliability based on forward error correction (FEC).

FIG. 9 is a diagram 900 illustrating PDCP reliability based on forward error correction (FEC). The scheme depicted in FIG. 9 is periodic. Here, parity PDUs 912 are scheduled to be transmitted from a PDCP Tx 902 after a time duration (T-parity) without feedback from a PDCP Rx 904. Hence, the scheme allows for a smaller reordering buffer as delay is shorter (e.g., T-parity<retransmission timer). More bandwidth may be used if the parity PDUs are pre-scheduled for transmission based on estimation. The parity PDUs may be transmitted on a more stable link for better performance. In an aspect of the disclosure, an algorithm for the scheme of FIG. 9 may be as follows. First, the PDCP Tx 902 periodically estimates an expected PDCP error rate P 910, e.g., based on a periodic PDCP status PDU (measurement) from the PDCP Rx 904. Next, the PDCP Tx 902 determines a generation size f(P) for one or more parity PDUs. In this example, the generation size=4 PDUs. Thereafter, the PDCP Tx 902 schedules a transmission of parity PDU(s) 912 for some time (T-parity) after the transmission of the last packet of a generation, wherein T-parity>TTI. In an aspect of the scheme, it is made sure that parity is in a different MAC PDU. In an aspect of the disclosure, parameters such as a generation size, a timer duration (e.g., T-parity), and a coding scheme may be configured based on a radio resource control (RRC) message.

Figure 10:
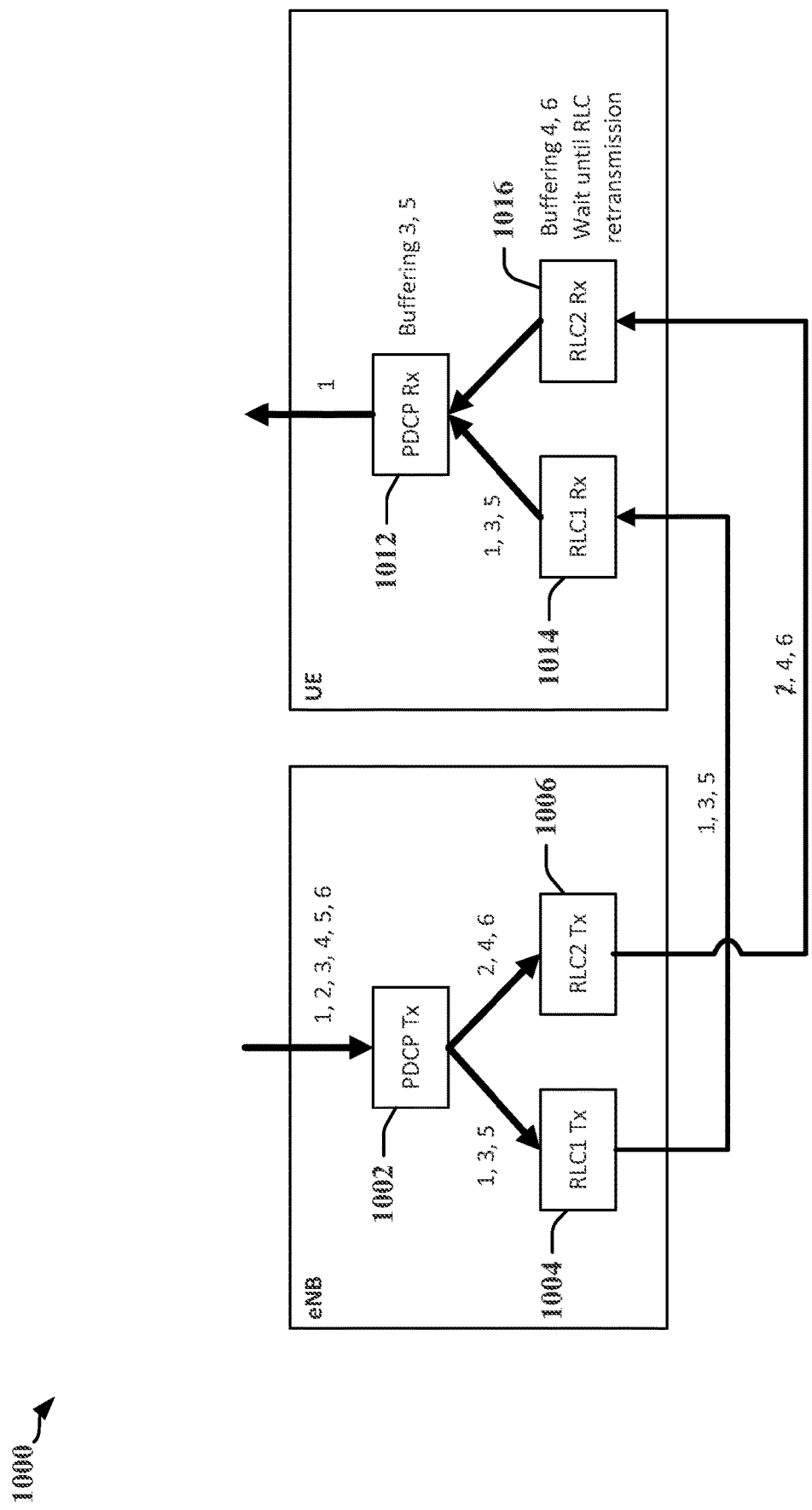
FIG. 10 is a diagram illustrating error correction at the PDCP according to a legacy LTE system enforcing RLC AM.

FIGS. 10 to 13 are diagrams illustrating error correction at the PDCP. FIG. 10 is a diagram 1000 illustrating error correction at the PDCP according to a legacy LTE system enforcing RLC AM. A PDCP sender (PDCP Tx) 1002 transmits a sequence of PDUs 1, 2, 3, 4, 5, and 6 to a PDCP receiver (PDCP Rx) 1012 via a first RLC sender (RLC1 Tx) 1004 and a second RLC sender (RLC2 Tx) 1006. The PDCP Tx 1002 stores the transmitted PDUs 1, 2, 3, 4, 5, and 6 in a retransmission buffer for potential retransmission in case any one of the transmitted PDUs is not decoded or correctly received at the PDCP Rx 1012.

As shown in FIG. 10, the PDCP Tx 1002 forwards the PDUs 1, 3, and 5 to RLC1 Tx 1004 for sending to the PDCP Rx 1012 via a first RLC receiver (RLC1 Rx) 1014. Similarly, the PDCP Tx 1002 forwards the PDUs 2, 4, and 6 to RLC2 Tx 1006 for sending to the PDCP Rx 1012 via a second RLC receiver (RLC2 Rx) 1016. In the example shown, the RLC1 Rx 1014 decodes or correctly receives the PDU 1 and forwards the PDU 1 to the PDCP Rx 1012 for delivery to an upper layer.

Further in the example, the PDU 2 is not decoded or correctly received by the RLC2 Rx 1016. Consequently, the PDUs 3 and 5 correctly received by the RLC1 Rx 1014 and the PDUs 4 and 6 correctly received by the RLC2 Rx 1016 may not be forwarded to the upper layer until the RLC2 Rx 1016 decodes or correctly receives a retransmission of the PDU 2. In particular, the RLC Rx 1014 may forward the correctly received PDUs 3 and 5 to the PDCP Rx 1012 to be stored in a reordering buffer therein until the retransmission of the PDU 2 is correctly received at the RLC2 Rx 1016. Also, the RLC2 Rx 1016 may store the correctly received PDUs 4 and 6 in its own reordering buffer until the RLC2 Rx 1016 correctly receives the PDU 2 retransmission. Upon correctly receiving the retransmission of the PDU 2, the RLC2 Rx 1016 reorders the buffered PDUs 4 and 6 with the received PDU 2 to deliver the PDUs 2, 4, and 6 in sequence to the PDCP Rx 1012. The PDCP Rx 1012 then reorders the buffered PDUs 3 and 5 with the received PDUs 2, 4, and 6 to deliver the PDUs 2, 3, 4, 5, and 6 in sequence to the upper layer.

Figure 11:
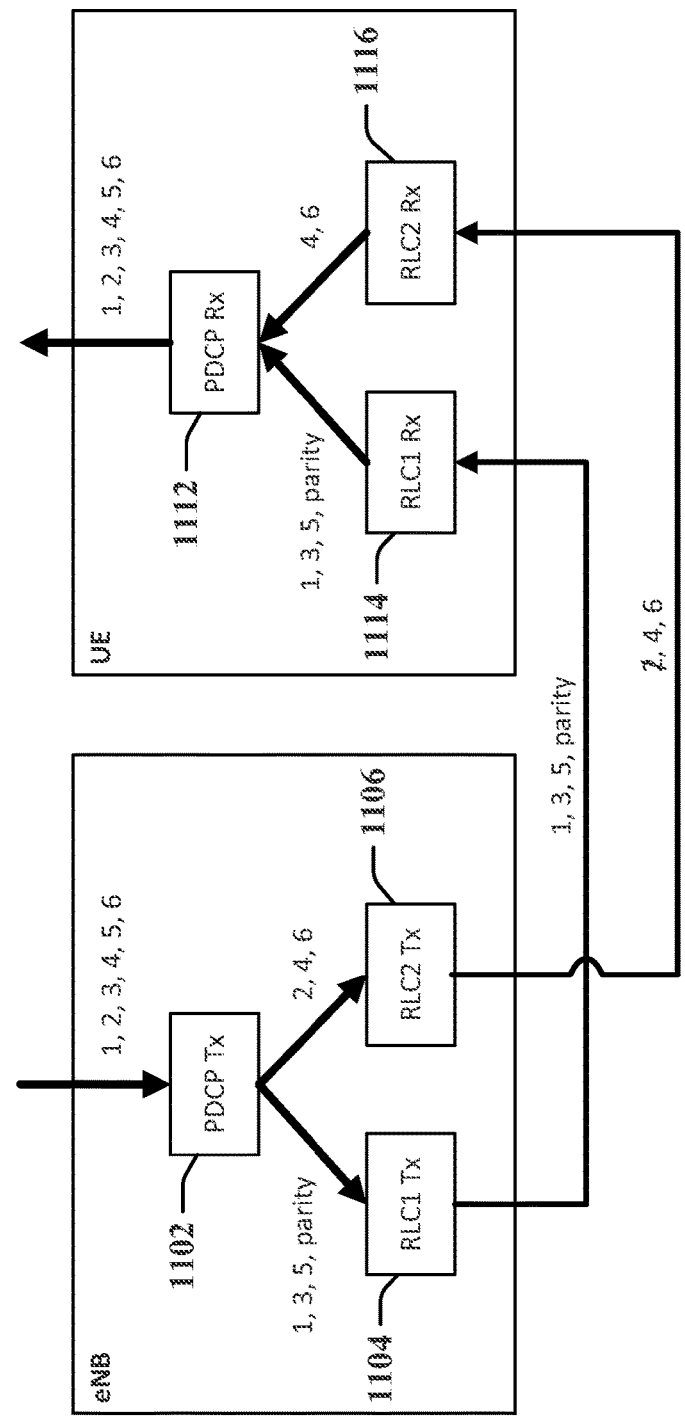
FIG. 11 is a diagram illustrating error correction at the PDCP via PDCP FEC.

FIG. 11 is a diagram 1100 illustrating error correction at the PDCP via PDCP forward error correction (FEC). The scheme depicted in FIG. 11 allows for short latency and the sending of parity on a more reliable link. A PDCP sender (PDCP Tx) 1102 transmits a sequence of PDUs 1, 2, 3, 4, 5, and 6 to a PDCP receiver (PDCP Rx) 1112 via a first RLC sender (RLC1 Tx) 1104 and a second RLC sender (RLC2 Tx) 1106. The PDCP Tx 1102 further encodes the sequence of transmitted PDUs to generate one or more parity PDUs, which are also transmitted to the PDCP Rx 1112. The one or more parity PDUs may be used by the PDCP Rx 1112 to recover any one of the transmitted PDUs not decoded or correctly received.

As shown in FIG. 11, the PDCP Tx 1102 forwards the PDUs 1, 3, and 5 to RLC1 Tx 1104 for sending to the PDCP Rx 1112 via a first RLC receiver (RLC1 Rx) 1114. Similarly, the PDCP Tx 1102 forwards the PDUs 2, 4, and 6 to RLC2 Tx 1106 for sending to the PDCP Rx 1012 via a second RLC receiver (RLC2 Rx) 1116. The PDCP Tx 1102 also forwards the one or more parity PDUs to the RLC1 Tx 1104 for sending to the PDCP Rx 1112 via the RLC1 Rx 1114.

In the example shown, the RLC1 Rx 1114 decodes or correctly receives the PDUs 1, 3 and 5 and the one or more parity PDUs and forwards them to the PDCP Rx 1112. The RLC2 Rx 1116 decodes or correctly receives the PDUs 4 and 6 and forwards them to the PDCP Rx 1112 but does not, however, decode or correctly receive the PDU 2. Consequently, the PDCP Rx 1112 may deliver the PDU 1 to an upper layer but may not deliver the PDUs 3, 4, 5, and 6 (received out of sequence with respect to the PDU 2) until the PDU 2 is recovered at the PDCP Rx 1112. The PDUs 3, 4, 5, and 6 received out of sequence may be stored in a reordering buffer until the sequentially previous PDU 2 is recovered by the PDCP Rx 1112.

The PDCP Rx 1112 may decode the one or more parity PDUs and use the decoded one or more parity PDUs to recover the PDU 2. Upon recovering the PDU 2, the PDCP Rx 1112 reorders the buffered PDUs 3, 4, 5, and 6 with the recovered PDU 2 to deliver the PDUs 2, 3, 4, 5, and 6 in sequence to the upper layer.

Figure 12:
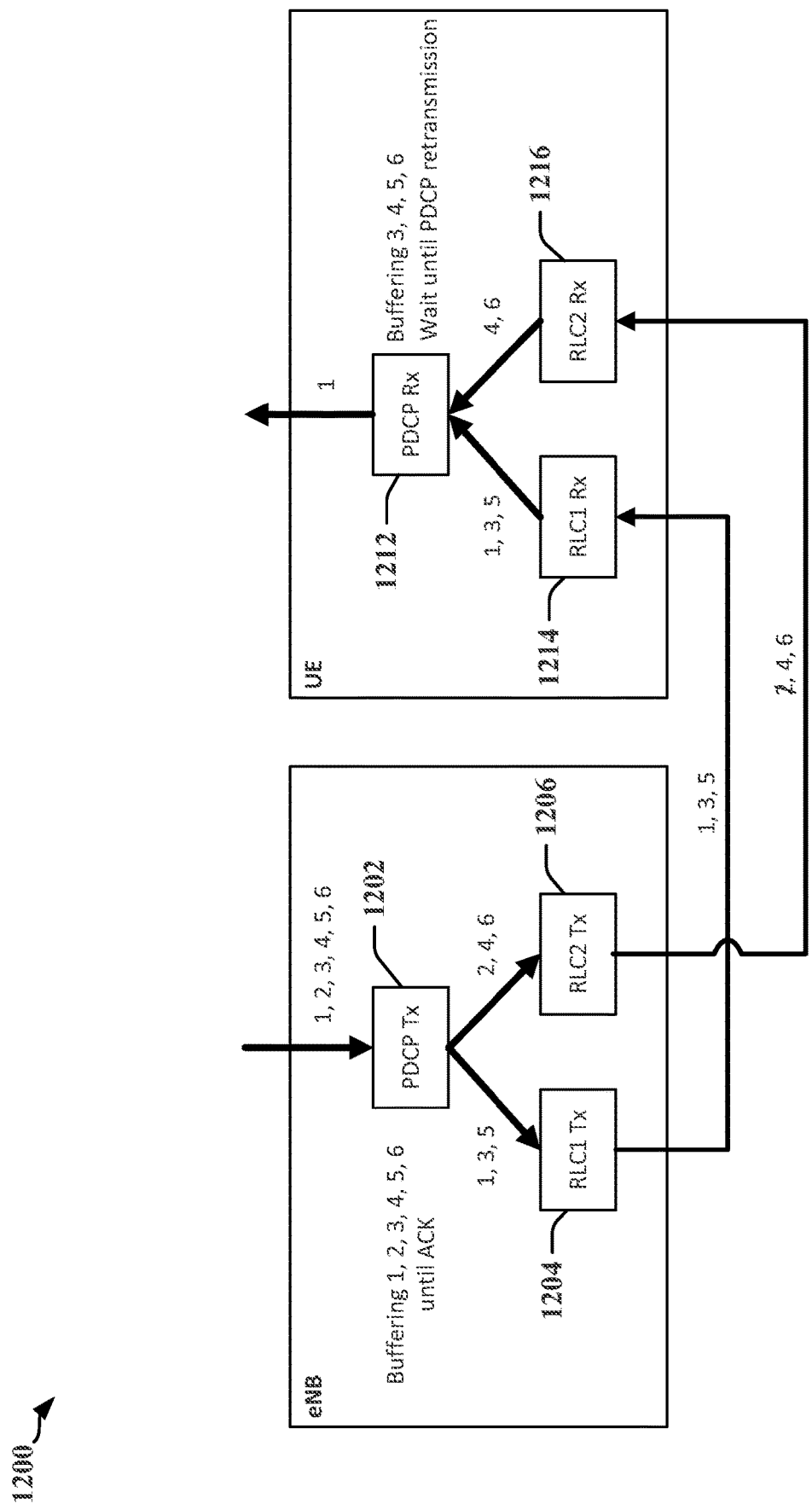
FIG. 12 is a diagram illustrating error correction at the PDCP via PDCP retransmission.

FIG. 12 is a diagram 1200 illustrating error correction at the PDCP via PDCP retransmission. The scheme depicted in FIG. 12 is efficient as it eliminates an RLC reordering wait time. A buffer cost may be the same as in presently known schemes. A PDCP sender (PDCP Tx) 1202 transmits a sequence of PDUs 1, 2, 3, 4, 5, and 6 to a PDCP receiver (PDCP Rx) 1212 via a first RLC sender (RLC1 Tx) 1204 and a second RLC sender (RLC2 Tx) 1206. The PDCP Tx 1202 stores the transmitted PDUs 1, 2, 3, 4, 5, and 6 in a retransmission buffer for potential retransmission in case any one of the transmitted PDUs is not decoded or correctly received at the PDCP Rx 1212. A transmitted PDU may be stored in the retransmission buffer until an acknowledgement (ACK) is received for the transmitted PDU from the PDCP Rx 1212.

As shown in FIG. 12, the PDCP Tx 1202 forwards the PDUs 1, 3, and 5 to RLC1 Tx 1204 for sending to the PDCP Rx 1212 via a first RLC receiver (RLC1 Rx) 1214. Similarly, the PDCP Tx 1202 forwards the PDUs 2, 4, and 6 to RLC2 Tx 1206 for sending to the PDCP Rx 1212 via a second RLC receiver (RLC2 Rx) 1216. In the example shown, the RLC1 Rx 1214 decodes or correctly receives the PDUs 1, 3 and 5 and forwards them to the PDCP Rx 1212. The RLC2 Rx 1216 decodes or correctly receives the PDUs 4 and 6 and forwards them to the PDCP Rx 1212 but does not, however, decode or correctly receive the PDU 2. Consequently, the PDCP Rx 1212 may deliver the PDU 1 to an upper layer but may not deliver the PDUs 3, 4, 5, and 6 (received out of sequence with respect to the PDU 2) until the PDU 2 is recovered at the PDCP Rx 1212. The PDUs 3, 4, 5, and 6 received out of sequence may be stored in a reordering buffer until a retransmission of the sequentially previous PDU 2 from the PDCP Tx 1202 is received by the PDCP Rx 1212.

The PDCP Rx 1212 may send to the PDCP Tx 1202 an acknowledgement for all PDUs decoded or correctly received (e.g., the PDUs 1, 3, 4, 5, and 6). Accordingly, when the PDCP Tx 1202 detects that no acknowledgement is received for the PDU 2, the PDCP Tx 1202 will retransmit the PDU 2 that is stored in the retransmission buffer. Upon correctly receiving the retransmission of the PDU 2, the RLC2 Rx 1216 delivers the PDU 2 to the PDCP Rx 1212. The PDCP Rx 1212 then reorders the buffered PDUs 3, 4, 5, and 6 with the recovered PDU 2 to deliver the PDUs 2, 3, 4, 5, and 6 in sequence to the upper layer.

Figure 13:
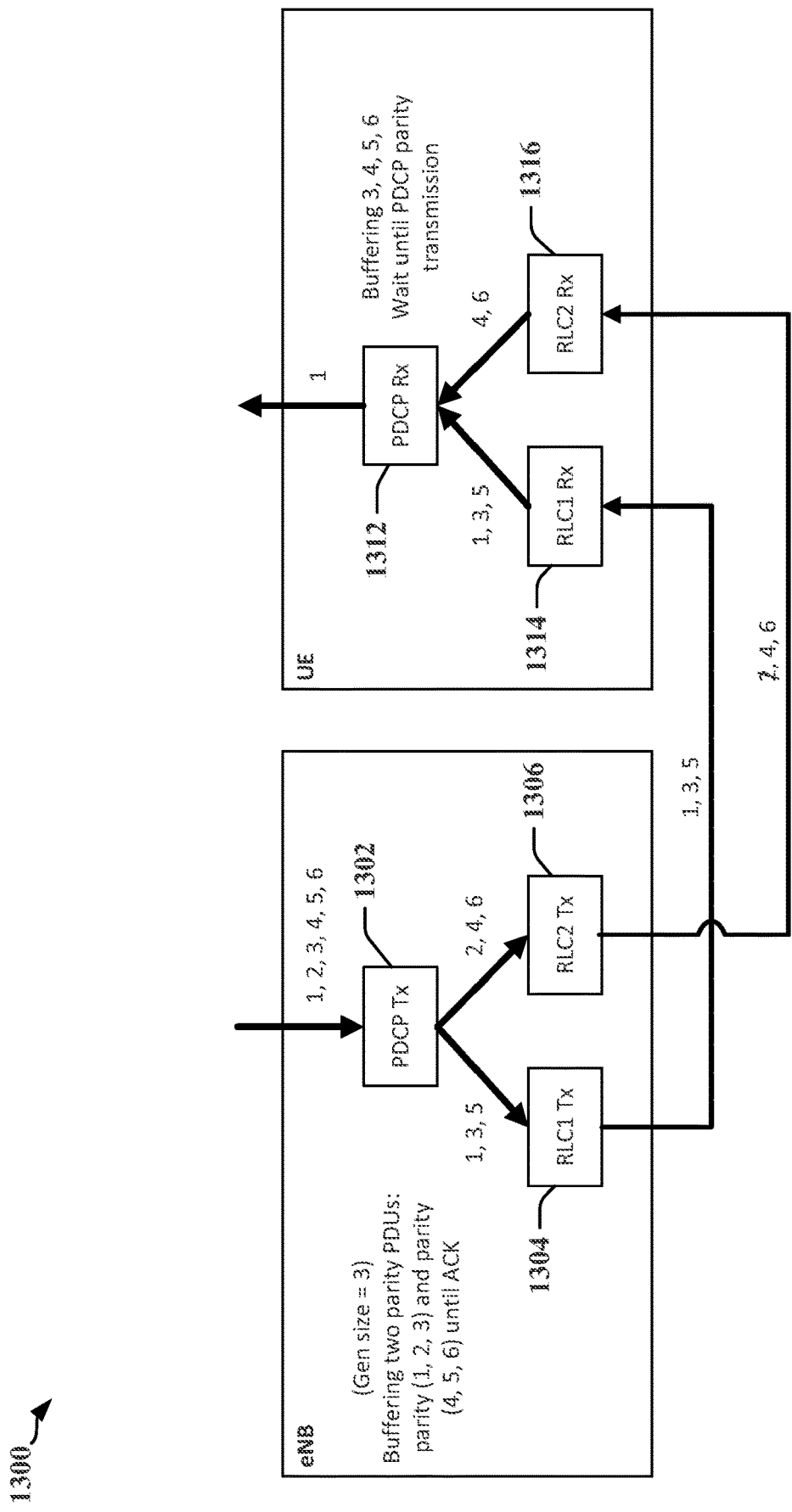
FIG. 13 is a diagram illustrating error correction at the PDCP via parity based retransmission.

FIG. 13 is a diagram 1300 illustrating error correction at the PDCP via parity based retransmission. The scheme depicted in FIG. 13 buffers only parity packets. Hence, the scheme is efficient as it eliminates an RLC reordering time. A buffer cost may also be reduced. A PDCP sender (PDCP Tx) 1302 transmits a sequence of PDUs 1, 2, 3, 4, 5, and 6 to a PDCP receiver (PDCP Rx) 1312 via a first RLC sender (RLC1 Tx) 1304 and a second RLC sender (RLC2 Tx) 1306. The PDCP Tx 1302 further encodes the sequence of transmitted PDUs to generate one or more parity PDUs. For example, if a generation size for the one or more parity PDUs=3 PDUs, then the PDCP Tx 1302 may generate a first parity PDU associated with the PDUs 1, 2, and 3 and a second parity PDU associated with the PDUs 4, 5, and 6. The one or more parity PDUs may be used by the PDCP Rx 1312 to recover an associated PDU that was not decoded or correctly received. Moreover, a parity PDU may be stored in a retransmission buffer until an acknowledgement (ACK) from the PDCP Rx 1312 is received for all transmitted PDUs associated with the parity PDU.

As shown in FIG. 13, the PDCP Tx 1302 forwards the PDUs 1, 3, and 5 to RLC1 Tx 1304 for sending to the PDCP Rx 1312 via a first RLC receiver (RLC1 Rx) 1314. Similarly, the PDCP Tx 1302 forwards PDUs 2, 4, and 6 to RLC2 Tx 1306 for sending to the PDCP Rx 1312 via a second RLC receiver (RLC2 Rx) 1316. In the example shown, the RLC1 Rx 1314 decodes or correctly receives the PDUs 1, 3 and 5 and forwards them to the PDCP Rx 1312. The RLC2 Rx 1316 decodes or correctly receives the PDUs 4 and 6 and forwards them to the PDCP Rx 1312 but does not, however, decode or correctly receive the PDU 2. Consequently, the PDCP Rx 1312 may deliver the PDU 1 to an upper layer but may not deliver the PDUs 3, 4, 5, and 6 (received out of sequence with respect to the PDU 2) until the PDU 2 is recovered at the PDCP Rx 1312. The PDUs 3, 4, 5, and 6 received out of sequence may be stored in a reordering buffer until the sequentially previous PDU 2 is recovered by the PDCP Rx 1312.

The PDCP Rx 1312 may send to the PDCP Tx 1302 an acknowledgement for all PDUs decoded or correctly received (e.g., the PDUs 1, 3, 4, 5, and 6). Accordingly, when the PDCP Tx 1302 detects that no acknowledgement is received for the PDU 2, the PDCP Tx 1302 will transmit the first parity PDU associated with the PDUs 1, 2, and 3. Upon receiving the first parity PDU, the RLC1 Rx 1314 (or RLC2 Rx 1316) delivers the first parity PDU to the PDCP Rx 1312. The PDCP Rx 1312 may then use the first parity PDU to recover the PDU 2. Upon recovering the PDU 2, the PDCP Rx 1312 reorders the buffered PDUs 3, 4, 5, and 6 with the recovered PDU 2 to deliver the PDUs 2, 3, 4, 5, and 6 in sequence to the upper layer.

Figure 14:
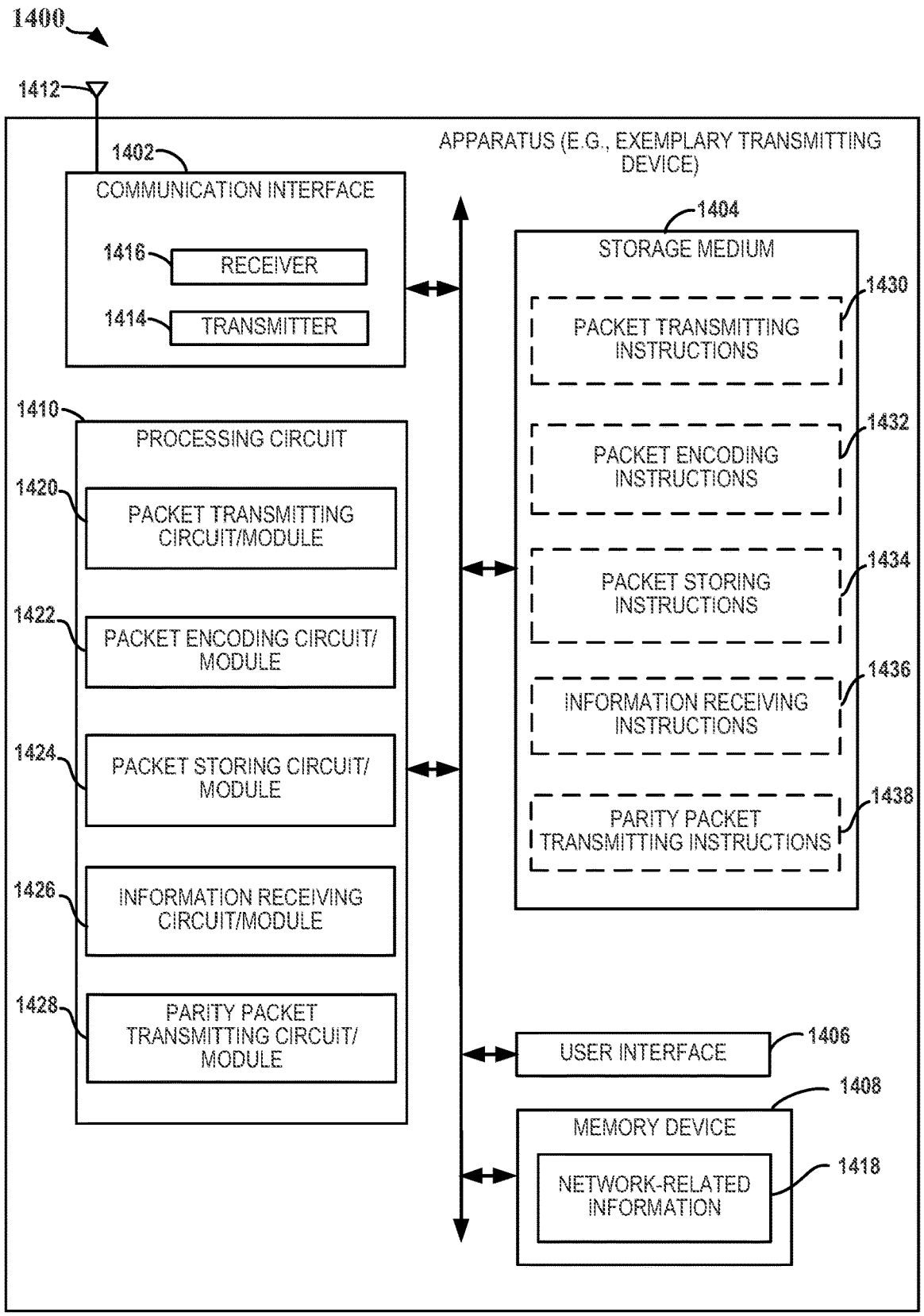
FIG. 14 is an illustration of a transmitting apparatus configured to support operations related to retransmitting data packets in a wireless communication network according to one or more aspects of the disclosure.

Exemplary Devices and Methods for Retransmitting Data in a Wireless Communication Network FIG. 14 is an illustration of a transmitting apparatus 1400 configured to support operations related to retransmitting data packets in a wireless communication network according to one or more aspects of the disclosure (e.g., aspects related to the methods of FIG. 15 described below). The apparatus 1400 includes a communication interface (e.g., at least one transceiver) 1402, a storage medium 1404, a user interface 1406, a memory device 1408, and a processing circuit 1410.

These components can be coupled to and/or placed in electrical communication with one another via a signaling bus or other suitable component, represented generally by the connection lines in FIG. 14. The signaling bus may include any number of interconnecting buses and bridges depending on the specific application of the processing circuit 1410 and the overall design constraints. The signaling bus links together various circuits such that each of the communication interface 1402, the storage medium 1404, the user interface 1406, and the memory device 1408 are coupled to and/or in electrical communication with the processing circuit 1410. The signaling bus may also link various other circuits (not shown) such as timing sources, peripherals, voltage regulators, and power management circuits, which are well known in the art, and therefore, will not be described any further.

The communication interface 1402 may be adapted to facilitate wireless communication of the apparatus 1400. For example, the communication interface 1402 may include circuitry and/or code (e.g., instructions) adapted to facilitate the communication of information bi-directionally with respect to one or more communication devices in a network. The communication interface 1402 may be coupled to one or more antennas 1412 for wireless communication within a wireless communication system. The communication interface 1402 can be configured with one or more standalone receivers and/or transmitters, as well as one or more transceivers. In the illustrated example, the communication interface 1402 includes a transmitter 1414 and a receiver 1416.

The memory device 1408 may represent one or more memory devices. As indicated, the memory device 1408 may maintain network-related information 1418 along with other information used by the apparatus 1400. In some implementations, the memory device 1408 and the storage medium 1404 are implemented as a common memory component. The memory device 1408 may also be used for storing data that is manipulated by the processing circuit 1410 or some other component of the apparatus 1400.

The storage medium 1404 may represent one or more computer-readable, machine-readable, and/or processor-readable devices for storing code, such as processor executable code or instructions (e.g., software, firmware), electronic data, databases, or other digital information. The storage medium 1404 may also be used for storing data that is manipulated by the processing circuit 1410 when executing code. The storage medium 1404 may be any available media that can be accessed by a general purpose or special purpose processor, including portable or fixed storage devices, optical storage devices, and various other mediums capable of storing, containing or carrying code.

By way of example and not limitation, the storage medium 1404 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 1404 may be embodied in an article of manufacture (e.g., a computer program product). By way of example, a computer program product may include a computer-readable medium in packaging materials. In view of the above, in some implementations, the storage medium 1404 may be a non-transitory (e.g., tangible) storage medium.

The storage medium 1404 may be coupled to the processing circuit 1410 such that the processing circuit 1410 can read information from, and write information to, the storage medium 1404. That is, the storage medium 1404 can be coupled to the processing circuit 1410 so that the storage medium 1404 is at least accessible by the processing circuit 1410, including examples where at least one storage medium is integral to the processing circuit 1410 and/or examples where at least one storage medium is separate from the processing circuit 1410 (e.g., resident in the apparatus 1400, external to the apparatus 1400, distributed across multiple entities, etc.).

Code and/or instructions stored by the storage medium 1404, when executed by the processing circuit 1410, causes the processing circuit 1410 to perform one or more of the various functions and/or process operations described herein. For example, the storage medium 1404 may include operations configured for regulating operations at one or more hardware blocks of the processing circuit 1410, as well as to utilize the communication interface 1402 for wireless communication utilizing their respective communication protocols.

The processing circuit 1410 is generally adapted for processing, including the execution of such code/instructions stored on the storage medium 1404. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1410 is arranged to obtain, process and/or send data, control data access and storage, issue commands, and control other desired operations. The processing circuit 1410 may include circuitry configured to implement desired code provided by appropriate media in at least one example. For example, the processing circuit 1410 may be implemented as one or more processors, one or more controllers, and/or other structure configured to execute executable code. Examples of the processing circuit 1410 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1410 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1410 are for illustration and other suitable configurations within the scope of the disclosure are also contemplated.

According to one or more aspects of the disclosure, the processing circuit 1410 may be adapted to perform any or all of the features, processes, functions, operations and/or routines for any or all of the apparatuses described herein. As used herein, the term "adapted" in relation to the processing circuit 1410 may refer to the processing circuit 1410 being one or more of configured, employed, implemented, and/or programmed to perform a particular process, function, operation and/or routine according to various features described herein.

Figure 15:
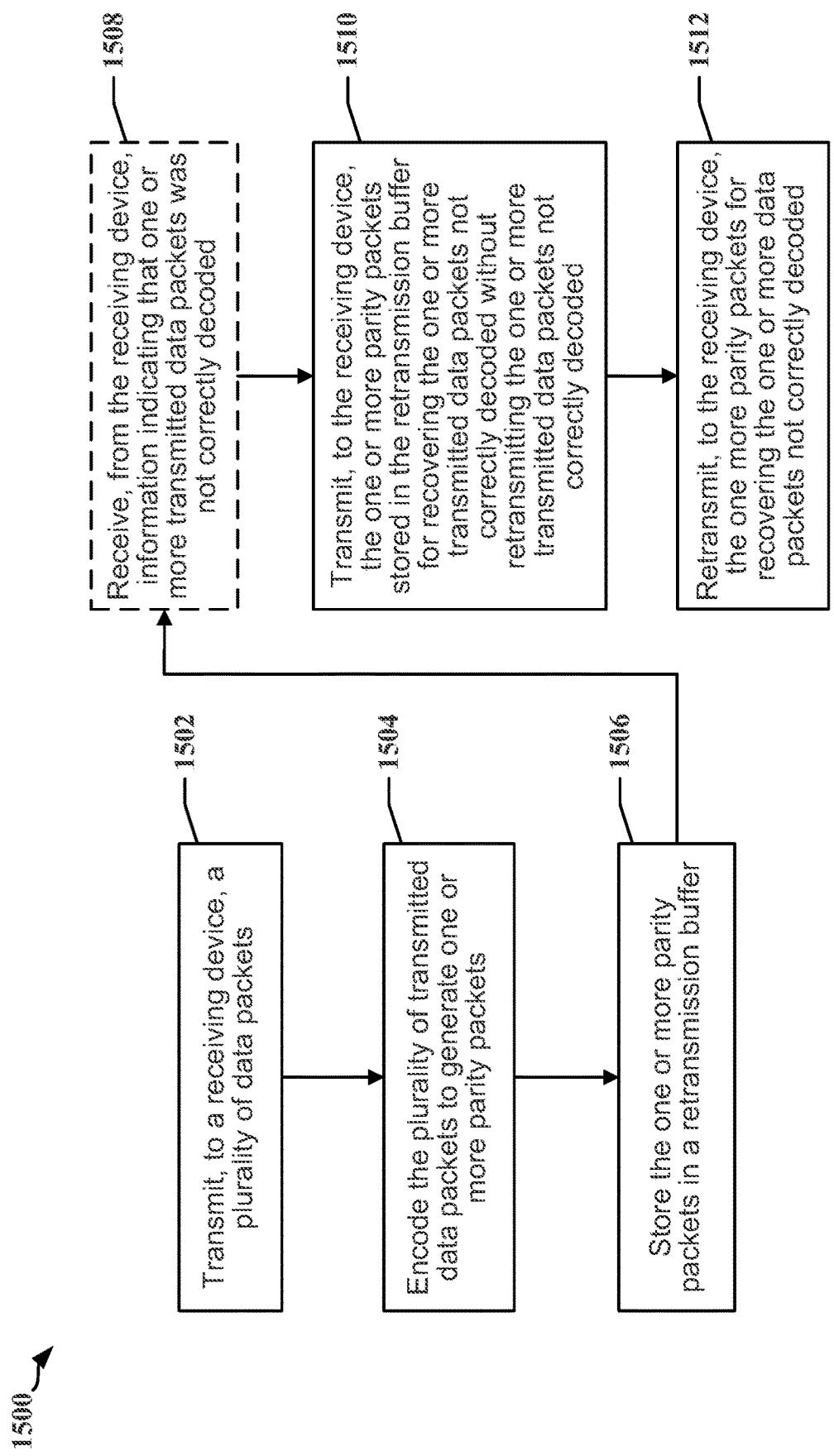
FIG. 15 is a flowchart illustrating a method of wireless communication at a transmitting device.

According to at least one example of the apparatus 1400, the processing circuit 1410 may include one or more of a packet transmitting circuit/module 1420, a packet encoding circuit/module 1422, a packet storing circuit/module 1424, an information receiving circuit/module 1426, and a parity packet transmitting circuit/module 1428, that are adapted to perform any or all of the features, processes, functions, operations and/or routines described herein (e.g., features, processes, functions, operations and/or routines described with respect to FIG. 15).

The packet transmitting circuit/module 1420 may include circuitry and/or instructions (e.g., packet transmitting instructions 1430 stored on the storage medium 1404) adapted to perform several functions relating to, for example, transmitting a plurality of data packets to a receiving device and/or retransmitting a data packet to the receiving device that was not previously decoded at the receiving device.

The packet encoding circuit/module 1422 may include circuitry and/or instructions (e.g., packet encoding instructions 1432 stored on the storage medium 1404) adapted to perform several functions relating to, for example, encoding the plurality of transmitted data packets to generate one or more parity packets.

The packet storing circuit/module 1424 may include circuitry and/or instructions (e.g., packet storing instructions 1434 stored on the storage medium 1404) adapted to perform several functions relating to, for example, storing the one or more parity packets in a retransmission buffer.

The information receiving circuit/module 1426 may include circuitry and/or instructions (e.g., information receiving instructions 1436 stored on the storage medium 1404) adapted to perform several functions relating to, for example, receiving, from the receiving device, information indicating that one or more transmitted data packets was not correctly decoded and/or a number of the one or more transmitted data packets that was not correctly decoded.

The parity packet transmitting circuit/module 1428 may further include circuitry and/or instructions (e.g., parity packet transmitting instructions 1438 stored on the storage medium 1404) adapted to perform several functions relating to, for example, transmitting and/or retransmitting, to the receiving device, the one or more parity packets stored in the retransmission buffer for recovering the one or more transmitted data packets not correctly decoded without retransmitting the one or more transmitted data packets not correctly decoded.

As mentioned above, instructions stored by the storage medium 1404, when executed by the processing circuit 1410, causes the processing circuit 1410 to perform one or more of the various functions and/or process operations described herein. For example, the storage medium 1404 may include one or more of the packet transmitting instructions 1430, the packet encoding instructions 1432, the packet storing instructions 1434, the information receiving instructions 1436, and the parity packet transmitting instructions 1438.

FIG. 15 is a flowchart 1500 illustrating a method of wireless communication at a transmitting device (e.g., first wireless device). The method may be performed by an apparatus (e.g., scheduling entity 202, apparatus 1400 employing processing circuit 1410, or any other suitable apparatus or means for carrying out the described functions).

The apparatus transmits a plurality of data packets to a receiving device (e.g., second wireless device) 1502. The apparatus encodes the plurality of transmitted data packets to generate one or more parity packets 1504. The plurality of data packets transmitted to the receiving device (at 1502) does not include the one or more parity packets. The encoding may be performed according to a coding scheme that is configured based on a radio resource control (RRC) message. In an aspect of the disclosure, the plurality of transmitted data packets are encoded at a medium access control (MAC) layer or a radio link control (RLC) layer of the apparatus. In another aspect of the disclosure, the encoding is performed across multiple links at a packet data convergence (PDCP) layer. The plurality of transmitted data packets encoded at the PDCP layer may be transmitted using different transport blocks at the MAC layer. In a further aspect of the disclosure, each of the plurality of data packets have a unified code block size for different modulation and coding schemes.

The apparatus further stores the one or more parity packets in a retransmission buffer 1506. In an aspect of the disclosure, the one or more parity packets are stored in the retransmission buffer based on a status timer duration and a generation size. The status timer duration and the generation size may be configured based on a radio resource control (RRC) message. In an aspect of the disclosure, the retransmission buffer is located at the MAC (or radio link control (RLC)) layer of the apparatus.

The apparatus may receive, from the receiving device, information indicating that one or more transmitted data packets was not correctly decoded and/or a number of the one or more transmitted data packets that was not correctly decoded 1508. In response, the apparatus may transmit, to the receiving device, the one or more parity packets stored in the retransmission buffer for recovering the one or more transmitted data packets not correctly decoded without retransmitting the one or more transmitted data packets not correctly decoded 1510. In an aspect of the disclosure, the one or more parity packets may be transmitted based on the expiration of a parity timer duration that is configured based on a radio resource control (RRC) message. In an aspect of the disclosure, transmitting the one or more parity packets may include selecting an RLC entity or MAC entity at the receiving device and transmitting the one or more parity packets to the selected RLC entity or MAC entity. The apparatus may further retransmit, to the receiving device, the one or more parity packets for recovering the one or more transmitted data packets not correctly decoded 1512.

Figure 16:
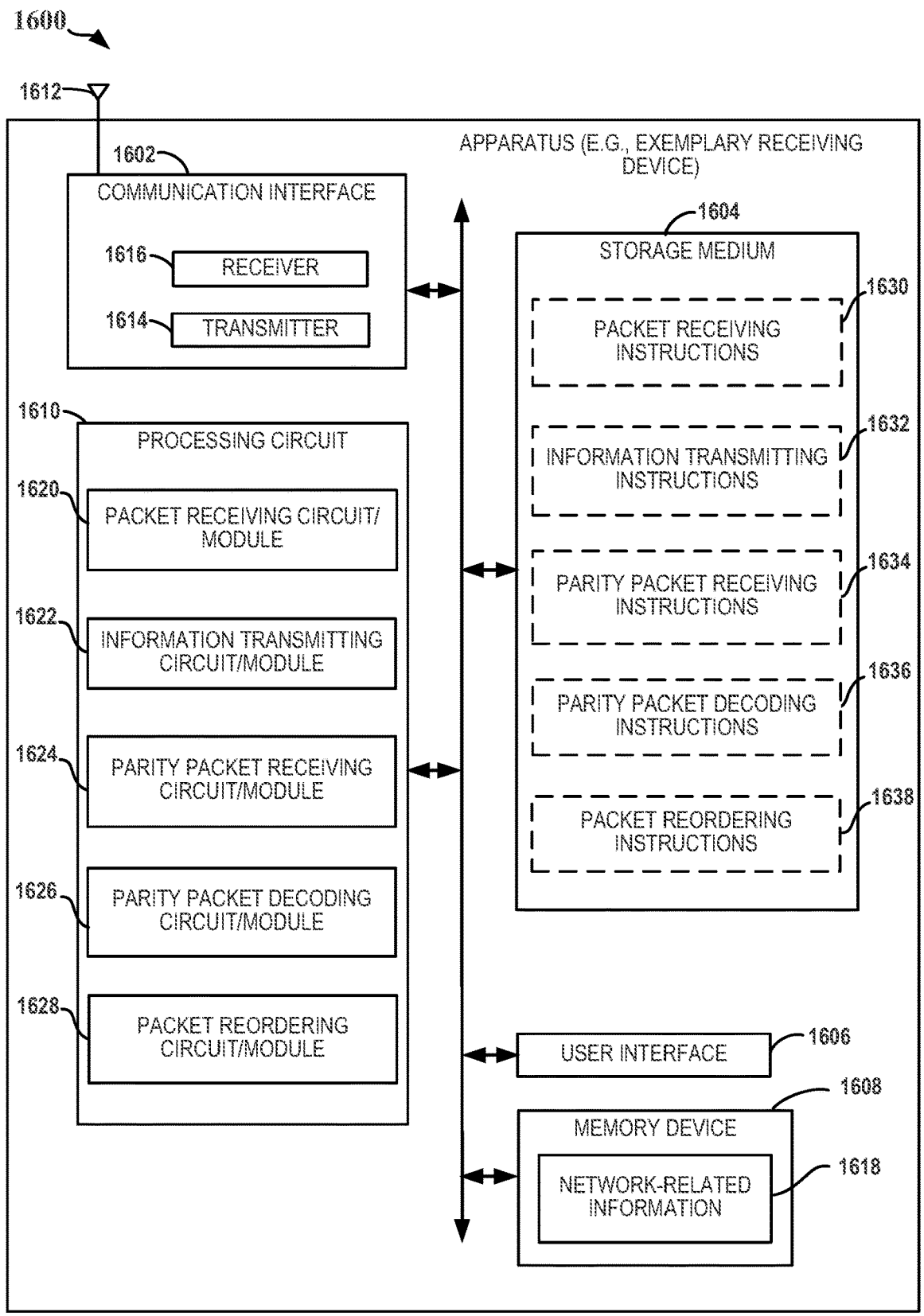
FIG. 16 is an illustration of a receiving apparatus configured to support operations related to retransmitting data packets in a wireless communication network according to one or more aspects of the disclosure.

FIG. 16 is an illustration of a receiving apparatus 1600 configured to support operations related to retransmitting data packets in a wireless communication network according to one or more aspects of the disclosure (e.g., aspects related to the methods of FIG. 17 described below). The apparatus 1600 includes a communication interface (e.g., at least one transceiver) 1602, a storage medium 1604, a user interface 1606, a memory device 1608, and a processing circuit 1610.

These components can be coupled to and/or placed in electrical communication with one another via a signaling bus or other suitable component, represented generally by the connection lines in FIG. 16. The signaling bus may include any number of interconnecting buses and bridges depending on the specific application of the processing circuit 1610 and the overall design constraints. The signaling bus links together various circuits such that each of the communication interface 1602, the storage medium 1604, the user interface 1606, and the memory device 1608 are coupled to and/or in electrical communication with the processing circuit 1610. The signaling bus may also link various other circuits (not shown) such as timing sources, peripherals, voltage regulators, and power management circuits, which are well known in the art, and therefore, will not be described any further.

The communication interface 1602 may be adapted to facilitate wireless communication of the apparatus 1600. For example, the communication interface 1602 may include circuitry and/or code (e.g., instructions) adapted to facilitate the communication of information bi-directionally with respect to one or more communication devices in a network. The communication interface 1602 may be coupled to one or more antennas 1612 for wireless communication within a wireless communication system. The communication interface 1602 can be configured with one or more standalone receivers and/or transmitters, as well as one or more transceivers. In the illustrated example, the communication interface 1602 includes a transmitter 1614 and a receiver 1616.

The memory device 1608 may represent one or more memory devices. As indicated, the memory device 1608 may maintain network-related information 1618 along with other information used by the apparatus 1600. In some implementations, the memory device 1608 and the storage medium 1604 are implemented as a common memory component. The memory device 1608 may also be used for storing data that is manipulated by the processing circuit 1610 or some other component of the apparatus 1600.

The storage medium 1604 may represent one or more computer-readable, machine-readable, and/or processor-readable devices for storing code, such as processor executable code or instructions (e.g., software, firmware), electronic data, databases, or other digital information. The storage medium 1604 may also be used for storing data that is manipulated by the processing circuit 1610 when executing code. The storage medium 1604 may be any available media that can be accessed by a general purpose or special purpose processor, including portable or fixed storage devices, optical storage devices, and various other mediums capable of storing, containing or carrying code.

By way of example and not limitation, the storage medium 1604 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 1604 may be embodied in an article of manufacture (e.g., a computer program product). By way of example, a computer program product may include a computer-readable medium in packaging materials. In view of the above, in some implementations, the storage medium 1604 may be a non-transitory (e.g., tangible) storage medium.

The storage medium 1604 may be coupled to the processing circuit 1610 such that the processing circuit 1610 can read information from, and write information to, the storage medium 1604. That is, the storage medium 1604 can be coupled to the processing circuit 1610 so that the storage medium 1604 is at least accessible by the processing circuit 1610, including examples where at least one storage medium is integral to the processing circuit 1610 and/or examples where at least one storage medium is separate from the processing circuit 1610 (e.g., resident in the apparatus 1600, external to the apparatus 1600, distributed across multiple entities, etc.).

Code and/or instructions stored by the storage medium 1604, when executed by the processing circuit 1610, causes the processing circuit 1610 to perform one or more of the various functions and/or process operations described herein. For example, the storage medium 1604 may include operations configured for regulating operations at one or more hardware blocks of the processing circuit 1610, as well as to utilize the communication interface 1602 for wireless communication utilizing their respective communication protocols.

The processing circuit 1610 is generally adapted for processing, including the execution of such code/instructions stored on the storage medium 1604. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1610 is arranged to obtain, process and/or send data, control data access and storage, issue commands, and control other desired operations. The processing circuit 1610 may include circuitry configured to implement desired code provided by appropriate media in at least one example. For example, the processing circuit 1610 may be implemented as one or more processors, one or more controllers, and/or other structure configured to execute executable code. Examples of the processing circuit 1610 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1610 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1610 are for illustration and other suitable configurations within the scope of the disclosure are also contemplated.

According to one or more aspects of the disclosure, the processing circuit 1610 may be adapted to perform any or all of the features, processes, functions, operations and/or routines for any or all of the apparatuses described herein. As used herein, the term "adapted" in relation to the processing circuit 1610 may refer to the processing circuit 1610 being one or more of configured, employed, implemented, and/or programmed to perform a particular process, function, operation and/or routine according to various features described herein.

Figure 17:
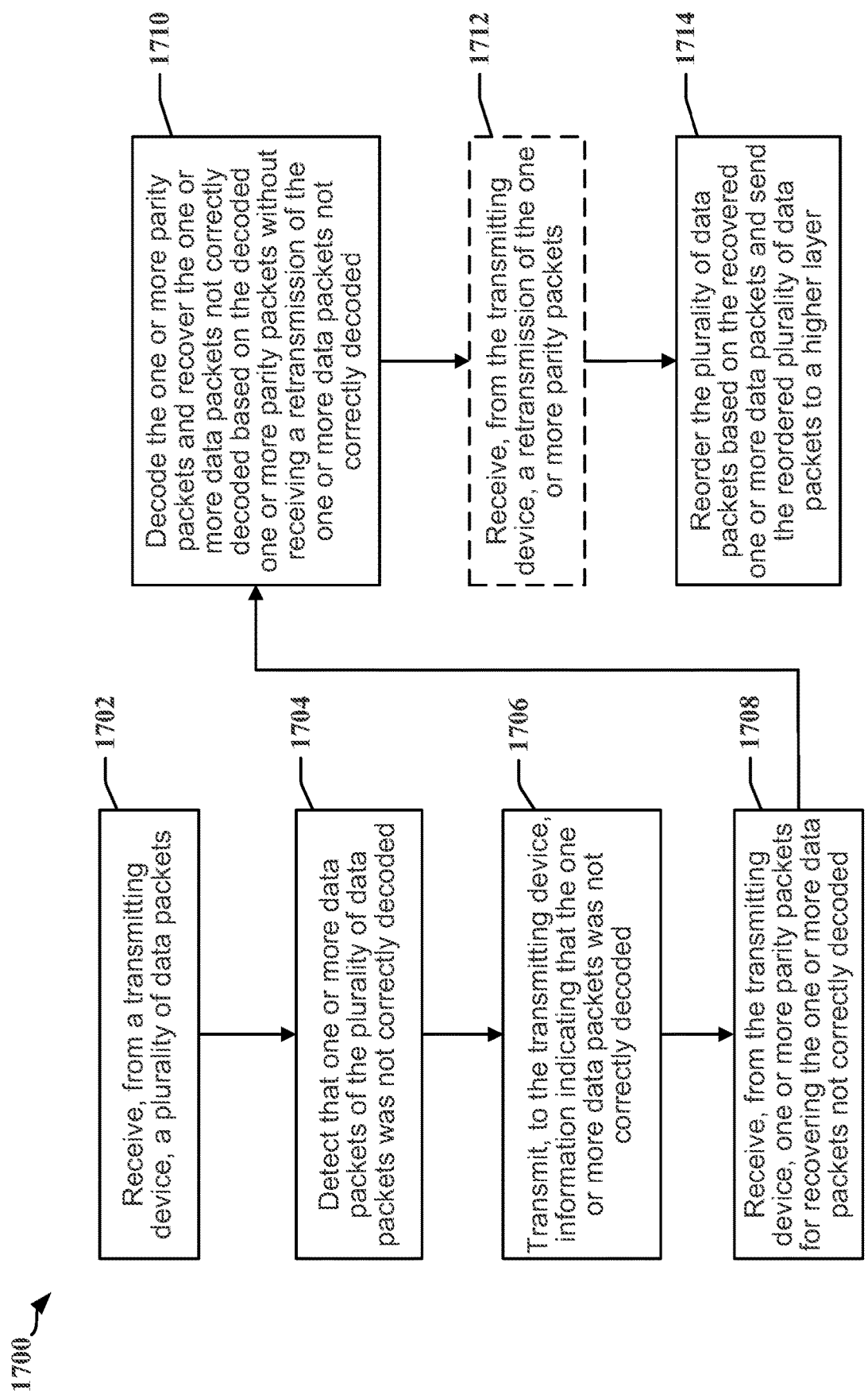
FIG. 17 is a flowchart illustrating a method of wireless communication at a receiving device.

According to at least one example of the apparatus 1600, the processing circuit 1610 may include one or more of a packet receiving circuit/module 1620, an information transmitting circuit/module 1622, a parity packet receiving circuit/module 1624, a parity packet decoding circuit/module 1626, and a packet reordering circuit/module 1628, that are adapted to perform any or all of the features, processes, functions, operations and/or routines described herein (e.g., features, processes, functions, operations and/or routines described with respect to FIG. 17).

The packet receiving circuit/module 1620 may include circuitry and/or instructions (e.g., packet receiving instructions 1630 stored on the storage medium 1604) adapted to perform several functions relating to, for example, receiving a plurality of data packets from a transmitting device, detecting that one or more data packets of the plurality of data packets was not correctly decoded, and/or receiving a retransmission of the one or more data packets not correctly decoded from the transmitting device.

The information transmitting circuit/module 1622 may include circuitry and/or instructions (e.g., information transmitting instructions 1632 stored on the storage medium 1604) adapted to perform several functions relating to, for example, transmitting, to the transmitting device, information indicating that the one or more data packets was not correctly decoded and/or a number of the one or more data packets that was not correctly decoded.

The parity packet receiving circuit/module 1624 may include circuitry and/or instructions (e.g., parity packet receiving instructions 1634 stored on the storage medium 1604) adapted to perform several functions relating to, for example, receiving, from the transmitting device, one or more parity packets for recovering the one or more data packets not correctly decoded.

The parity packet decoding circuit/module 1626 may include circuitry and/or instructions (e.g., parity packet decoding instructions 1636 stored on the storage medium 1604) adapted to perform several functions relating to, for example, decoding the one or more parity packets and recovering the one or more data packets not correctly decoded based on the decoded one or more parity packets without receiving a retransmission of the one or more data packets not correctly decoded. Recovery of the one or more data packets may further be based on a received retransmission of the one or more parity packets.

The packet reordering circuit/module 1628 may further include circuitry and/or instructions (e.g., packet reordering instructions 1638 stored on the storage medium 1604) adapted to perform several functions relating to, for example, reordering the plurality of data packets based on the recovered one or more data packets and sending the reordered plurality of data packets to a higher protocol layer for further processing. The reordering may include waiting for the retransmission of the one or more parity packets to recover the one or more data packets not correctly decoded prior to reordering the plurality of data packets.

As mentioned above, instructions stored by the storage medium 1604, when executed by the processing circuit 1610, causes the processing circuit 1610 to perform one or more of the various functions and/or process operations described herein. For example, the storage medium 1604 may include one or more of the packet receiving instructions 1630, the information transmitting instructions 1632, the parity packet receiving instructions 1634, the parity packet decoding instructions 1636, and the packet reordering instructions 1638.

FIG. 17 is a flowchart 1700 illustrating a method of wireless communication at a receiving device (e.g., first wireless device). The method may be performed by an apparatus (e.g., subordinate entity 204, apparatus 1600 employing processing circuit 1610, or any other suitable apparatus or means for carrying out the described functions).

The apparatus receives a plurality of data packets from a transmitting device (e.g., second wireless device) 1702. In an aspect of the disclosure, each of the plurality of data packets has a unified code block size for different modulation and coding schemes. Upon attempting to decode the plurality of data packets, the apparatus may detect that one or more data packets of the plurality of data packets was not correctly decoded (or not received correctly) 1704. The apparatus then transmits information indicating that the one or more data packets was not correctly decoded and/or a number of the one or more data packets that was not correctly decoded to the transmitting device 1706.

In response to the transmitted information, the apparatus receives, from the transmitting device, one or more parity packets for recovering the one or more data packets not correctly decoded 1708. Notably, the plurality of data packets received from the transmitting device (at 1702) did not include the one or more parity packets. The one or more parity packets may be received based on a parity timer duration that is configured based on a radio resource control (RRC) message. Thereafter, the apparatus decodes the one or more parity packets and recovers the one or more data packets not correctly decoded based on the decoded one or more parity packets without receiving a retransmission of the one or more data packets not correctly decoded 1710. The one or more parity packets may be decoded according to a coding scheme that is configured based on a radio resource control (RRC) message. In an aspect of the disclosure, the one or more parity packets are decoded at a medium access control (MAC) layer of the apparatus. In a further aspect of the disclosure, the decoding is performed across multiple links at a packet data convergence (PDCP) layer.

In an aspect of the disclosure, the apparatus may also receive, from the transmitting device, a retransmission of the one or more parity packets 1712. Accordingly, recovery of the one or more data packets may be further based on the received retransmission of the one or more parity packets.

The apparatus reorders the plurality of data packets based on the recovered one or more data packets 1714. In an aspect of the disclosure, the apparatus reorders by waiting for the transmission or retransmission of the one or more parity packets to recover the one or more data packets not correctly decoded prior to reordering the plurality of data packets. The apparatus may then send the reordered plurality of data packets to higher protocol layers for further processing. In an aspect of the disclosure, the reordering is performed at an RLC or PDCP layer of the apparatus.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within systems defined by 3GPP, such as Long-Term Evolution (LTE), the Evolved Packet System (EPS), the Universal Mobile Telecommunication System (UMTS), and/or the Global System for Mobile (GSM). Various aspects may also be implemented within evolved versions of an LTE network, such as a fifth-generation (5G) network. Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 7-13, 15, and 17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-4, 14, and 16 may be configured to perform one or more of the methods, features, or steps described herein. The novel algorithms described herein may also be efficiently implemented in software and/or embedded in hardware.

What is claimed is:

1. A method of wireless communication at a first wireless device, comprising:
   encoding a plurality of data packets to generate one or more parity packets;
   transmitting, to a second wireless device, the plurality of data packets;
   transmitting, to the second wireless device, the one or more parity packets for recovering one or more transmitted data packets not correctly decoded without retransmitting the one or more transmitted data packets; and
   wherein the plurality of transmitted data packets are encoded at a medium access control (MAC) layer, a radio link control (RLC) layer, or a packet data convergence protocol (PDCP) layer of the first wireless device.

2. The method of claim 1, wherein the one or more parity packets are transmitted independent of receiving, from the second wireless device, information indicating that the one or more transmitted data packets was not correctly decoded.

3. The method of claim 1, wherein the one or more parity packets are transmitted based on a parity timer duration that is configured based on a radio resource control (RRC) message.

4. The method of claim 1, wherein the plurality of transmitted data packets encoded at the PDCP layer are transmitted using different transport blocks at the MAC layer.

5. The method of claim 1, wherein each of the plurality of data packets have a unified code block size for different modulation and coding schemes.

6. The method of claim 1, wherein the plurality of transmitted data packets are encoded according to a coding scheme that is configured based on a radio resource control (RRC) message.

7. A first wireless device configured to communicate in a wireless network, comprising:
   a transceiver; and
   a processing circuit coupled to the transceiver, wherein the processing circuit is configured to:
   encode a plurality of data packets to generate one or more parity packets,
   transmit, to a second wireless device, the plurality of data packets,
   transmit, to the second wireless device, the one or more parity packets for recovering one or more transmitted data packets not correctly decoded without retransmitting the one or more transmitted data packets; and
   wherein the plurality of transmitted data packets are encoded at a medium access control (MAC) layer, a radio link control (RLC) layer, or a packet data convergence protocol (PDCP) layer of the first wireless device.

8. The first wireless device of claim 7, wherein the one or more parity packets are transmitted independent of receiving, from the second wireless device, information indicating that the one or more transmitted data packets was not correctly decoded.

9. The first wireless device of claim 7, wherein the one or more parity packets are transmitted based on a parity timer duration that is configured based on a radio resource control (RRC) message.

10. The first wireless device of claim 7, wherein the plurality of transmitted data packets encoded at the PDCP layer are transmitted using different transport blocks at the MAC layer.

11. The first wireless device of claim 7, wherein each of the plurality of data packets have a unified code block size for different modulation and coding schemes.

12. The first wireless device of claim 7, wherein the plurality of transmitted data packets are encoded according to a coding scheme that is configured based on a radio resource control (RRC) message.

13. A method of wireless communication at a first wireless device, comprising:
   receiving, from a second wireless device, a plurality of data packets;
   receiving, from the second wireless device, one or more parity packets for recovering one or more data packets of the plurality of data packets not correctly decoded;
   detecting that the one or more data packets was not correctly decoded;
   decoding the one or more parity packets and recovering the one or more data packets not correctly decoded based on the decoded one or more parity packets without receiving a retransmission of the one or more data packets not correctly decoded;
   reordering the plurality of data packets based on the recovered one or more data packets;
   sending the reordered plurality of data packets to a higher layer; and
   wherein the reordering is performed at a medium access control (MAC) layer, a radio link control (RLC) layer, or a packet data convergence protocol (PDCP) layer of the first wireless device.

14. The method of claim 13, wherein the one or more parity packets are received independent of transmitting, to the second wireless device, information indicating that the one or more data packets was not correctly decoded.

15. The method of claim 13, wherein the one or more parity packets are received based on a parity timer duration that is configured based on a radio resource control (RRC) message.

16. The method of claim 13, wherein each of the plurality of data packets have a unified code block size for different modulation and coding schemes.

17. The method of claim 13, wherein the one or more parity packets are decoded according to a coding scheme that is configured based on a radio resource control (RRC) message.

18. A first wireless device configured to communicate in a wireless network, comprising:
   a transceiver; and
   a processing circuit coupled to the transceiver, wherein the processing circuit is configured to:
   receive, from a second wireless device, a plurality of data packets,
   receive, from the second wireless device, one or more parity packets for recovering one or more data packets of the plurality of data packets not correctly decoded,
   detect that the one or more data packets was not correctly decoded,
   decode the one or more parity packets and recover the one or more data packets not correctly decoded based on the decoded one or more parity packets without receiving a retransmission of the one or more data packets not correctly decoded;

reorder the plurality of data packets based on the recovered one or more data packets;

send the reordered plurality of data packets to a higher layer; and wherein the reordering is performed at a medium access control (MAC) layer, a radio link control (RLC) layer, or a packet data convergence protocol (PDCP) layer of the first wireless device.

19. The first wireless device of claim 18, wherein the one or more parity packets are received independent of transmitting, to the second wireless device, information indicating that the one or more data packets was not correctly decoded.

20. The first wireless device of claim 18, wherein the one or more parity packets are received based on a parity timer duration that is configured based on a radio resource control (RRC) message.

21. The first wireless device of claim 18, wherein each of the plurality of data packets have a unified code block size for different modulation and coding schemes.

* * * * *